United States Patent
Jang et al.

(10) Patent No.: US 10,701,761 B2
(45) Date of Patent: Jun. 30, 2020

(54) NETWORK DEVICE AND BASE STATION DEVICE, AND DOWNLINK PACKET TRANSMISSION BASE STATION RESELECTING METHOD PERFORMED BY SAME DEVICE

(71) Applicant: SK TELECOM CO., LTD., Seoul (KR)

(72) Inventors: Jae Seong Jang, Seoul (KR); Chang Min Park, Seoul (KR); Dae Hyuk Kim, Seoul (KR); Jeong Seok Seo, Seoul (KR); Sang Min Lee, Seoul (KR); Deok Nyong Ko, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/093,777

(22) PCT Filed: Jun. 14, 2017

(86) PCT No.: PCT/KR2017/006185
§ 371 (c)(1),
(2) Date: Oct. 15, 2018

(87) PCT Pub. No.: WO2018/030626
PCT Pub. Date: Feb. 15, 2018

(65) Prior Publication Data
US 2019/0090310 A1    Mar. 21, 2019

(30) Foreign Application Priority Data

Aug. 8, 2016  (KR) .................. 10-2016-0100844
Aug. 8, 2016  (KR) .................. 10-2016-0100847

(51) Int. Cl.
*H04W 24/02*  (2009.01)
*H04W 88/08*  (2009.01)
(Continued)

(52) U.S. Cl.
CPC .......... *H04W 88/08* (2013.01); *H04B 17/336* (2015.01); *H04W 24/02* (2013.01);
(Continued)

(58) Field of Classification Search
CPC ..... H04W 88/08; H04W 24/02; H04W 28/06; H04B 17/336
See application file for complete search history.

(56) References Cited

U.S. PATENT DOCUMENTS

| | | | |
|---|---|---|---|
| 2014/0126403 A1* | 5/2014 | Siomina | H04W 24/10 370/252 |
| 2015/0163029 A1* | 6/2015 | Murakami | H04L 27/2627 370/476 |
| 2019/0021130 A1* | 1/2019 | Kim | H04W 72/042 |

FOREIGN PATENT DOCUMENTS

| | | |
|---|---|---|
| KR | 10-0714530 B1 | 5/2007 |
| KR | 10-0876765 B1 | 1/2009 |

(Continued)

OTHER PUBLICATIONS

Hui Yang Kim, Nation-wide Construction of SKT, IoT Network 'Lora', BBS News, Jul. 4, 2016.
(Continued)

*Primary Examiner* — Wei Zhao
(74) *Attorney, Agent, or Firm* — Hauptman Ham, LLP

(57) ABSTRACT

Disclosed is a technology for improving the quality of an IoT service by increasing the success rate of reception of a downlink packet transmitted to an IoT terminal through a new proposed method of solving a problem of downlink packet collision recognized by a BS.

13 Claims, 10 Drawing Sheets

(51) Int. Cl.
*H04W 88/12* (2009.01)
*H04B 17/336* (2015.01)
*H04W 28/06* (2009.01)
*H04W 36/08* (2009.01)
*H04W 48/20* (2009.01)

(52) U.S. Cl.
CPC .......... *H04W 28/06* (2013.01); *H04W 36/08* (2013.01); *H04W 88/12* (2013.01); *H04W 48/20* (2013.01)

(56) References Cited

FOREIGN PATENT DOCUMENTS

| KR | 10-2015-0013577 A | 2/2015 |
| KR | 10-2015-0125739 A | 11/2015 |
| KR | 10-2016-0077230 A | 7/2016 |

OTHER PUBLICATIONS

International Search Report for PCT/KR2017/006185 dated Aug. 30, 2017.

* cited by examiner

NETWORK DEVICE AND BASE STATION DEVICE, AND DOWNLINK PACKET TRANSMISSION BASE STATION RESELECTING METHOD PERFORMED BY SAME DEVICE

CROSS REFERENCE TO RELATED APPLICATION

This present application is a national stage filing under 35 U.S.C § 371 of PCT application number PCT/KR2017/006185 filed on Jun. 14, 2017 which is based upon and claims the benefit of priority to Korean Patent Application Nos. 10-2016-0100844 and 10-2016-0100847 both filed on Aug. 8, 2016 with the Korean Intellectual Property Office. The disclosures of the above-listed applications are hereby incorporated by reference herein in their entirety.

BACKGROUND OF THE INVENTION

1. Field of the Invention

The present disclosure relates to an Internet of Things (IoT) technology. More specifically, the present disclosure relates to a technology for improving the quality of an IoT service by increasing the success rate of reception of a downlink packet transmitted to an IoT terminal.

2. Description of the Prior Art

Internet-of-Things (IoT) technology for sharing information through wired/wireless network connections between objects in our lives has arisen, and has been spotlighted in various fields such as health care, remote meter reading, smart homes, smart cars, and smart farms.

An IoT network structure for providing an IoT service based on IoT technology will be briefly described below.

The IoT network consists of a remote IoT terminal, a customer terminal have an application for IoT (hereinafter, referred to as an IoT app) installed therein to identify data of the remote IoT terminal and control the IoT terminal, a network device (or an IoT app server) configured to connect the IoT terminal and the customer terminal (IoT app) through a wired/wireless network, and a gateway (for example, a BS) configured to transmit/receive packets between the IoT terminal and the network device.

The quality of the IoT service provided in the structure of the IoT network is influenced by the success rate of reception of uplink packets/downlink packets transmitted/received among three nodes of the IoT terminal, BS, and network device.

When the IoT terminal transmits an uplink packet to the network device, the IoT terminal transmits the uplink packet in a broadcast manner, so that a plurality of BS receive the uplink packet and transmit the uplink packet to the network device. Thus, it may be considered that the success rate of reception of the uplink packet is high.

However, when the network device transmits a downlink packet to the IoT terminal, the network device transmits the downlink packet to one BS preselected for the IoT terminal, and the one BS, having received the downlink packet, transmits the downlink packet to the IoT terminal.

In this case, if the BS transmits a downlink packet to another IoT terminal or occupies frequency resources for transmission, the BS recognizes it as downlink packet collision, drops the downlink packet, and does not transmit the downlink packet to the IoT terminal. Thus, the success rate of reception of the downlink packet is not good.

However, the current IoT technology has not presented a separate method of solving the problem of the downlink collision recognized by the BS.

Accordingly, the present disclosure increases the success rate of reception of the downlink packet transmitted to the IoT terminal by proposing a new method of solving the problem of downlink packet collision recognized by the BS.

SUMMARY OF THE INVENTION

The present disclosure is to improve the quality of IoT service by increasing the success rate of reception of a downlink packet transmitted to an IoT terminal.

In accordance with an aspect of the present disclosure, a network device is provided. The network device includes: a packet transmitter configured to transmit a downlink packet, which is to be transmitted to a terminal, to a Base Station (BS) selected for packet transmission/reception for each terminal; a recognition unit configured to recognize a specific terminal predicted to fail to receive the downlink packet in a specific BS; and a controller configured to, when the specific terminal is recognized, determine at least one of reselection of a BS and a time point of reselection for packet transmission/reception for the specific terminal.

In accordance with another aspect of the present disclosure, a network device is provided. The network device includes: a packet transmitter configured to transmit a downlink packet, which is to be transmitted to a terminal, to a Base Station (BS) selected for packet transmission/reception for each terminal; a recognition unit configured to recognize a specific terminal predicted to fail to receive the downlink packet in a specific BS; and a controller configured to, when the specific terminal is recognized, reselect a BS for the specific terminal and retransmit the downlink packet of the specific terminal to the reselected BS.

Specifically, the specific terminal, after transmitting an uplink packet, can receive a downlink packet for the uplink packet in predetermined time intervals a particular number of times, and the recognition unit, when a failure prediction result predicting failure of transmission of a downlink packet is received from the specific BS for a terminal, may recognize the terminal as the specific terminal, the downlink packet being transmitted for an uplink packet in a first time interval corresponding to one of the particular number of times.

Specifically, the controller may estimate a packet transmission/reception time with the specific BS based on a time point of transmission of the downlink packet of the specific terminal in the first time interval and a time point of reception of the failure prediction result for the downlink packet and determines whether to reselect the BS for the specific terminal based on the packet transmission/reception time.

Specifically, the controller may determine whether the specific terminal can receive the downlink packet in the first time interval when the downlink packet is retransmitted based on a time point of reception of an uplink packet of the specific terminal, the predetermined time, and the packet transmission/reception time, and reselects the BS for the specific terminal when the specific terminal can receive the downlink packet.

Specifically, the controller may reselect a BS having the best channel state (Signal to Noise Ratio (SNR)) with the specific terminal from BSs except for the specific BS from BSs that have received the uplink packet of the specific terminal and transmitted the uplink packet to the network device.

In accordance with another aspect of the present disclosure, a method of operating a network device is provided. The method includes: a packet transmission step of transmitting a downlink packet, which is to be transmitted to a terminal, to a Base Station (BS) for packet transmission/reception to/from each terminal; a recognition step of recognizing a specific terminal predicted to fail to transmit the downlink packet in a specific BS; and a reselection step of, when the specific terminal is recognized, reselecting a BS for the specific terminal and retransmitting the downlink packet of the specific terminal to the reselected BS.

Specifically, after transmitting an uplink packet, the specific terminal can receive the downlink packet for the uplink packet in the unit of predetermined time intervals a particular number of times, and the reselection step may include estimating a packet transmission/reception time with the specific BS based on a time point of transmission of the downlink packet transmitted in a first time interval corresponding to one of the particular number of times for the uplink packet of the specific terminal and a time point of reception of a failure prediction result for the downlink packet from the specific BS and determining whether to reselect the BS for the specific terminal based on the packet transmission/reception time.

Specifically, the reselection step may include determining whether the specific terminal can receive the downlink packet in the first time interval in retransmission of the downlink packet based on a time point of the reception of an uplink packet of the specific terminal, the predetermined time, and the packet transmission/reception time, and when the specific terminal can receive the downlink packet based on the determination result, reselecting the BS for the specific terminal.

In accordance with another aspect of the present disclosure, a network device is provided. The network device includes: a packet transmitter configured to transmit a downlink packet, which is to be transmitted to a terminal, to a Base Station (BS) for packet transmission/reception for each terminal; a recognition unit configured to recognize a specific terminal predicted to fail to receive the downlink packet in a specific BS; and a controller configured to, when the specific terminal is recognized, wait for a predetermined standby time based on a time point at which the specific terminal is recognized, reselect a BS for the specific terminal and retransmit the downlink packet of the specific terminal to the reselected BS.

Specifically, after transmitting an uplink packet, the specific terminal can receive a downlink packet for the uplink packet in a predetermined time interval a particular number of times, and the recognition unit, when a failure prediction result predicting failure of transmission of a downlink packet is received from the specific BS for a terminal, may recognize the terminal as the specific terminal, the downlink packet being transmitted for an uplink packet in a first time interval corresponding to one of the particular number of times.

Specifically, the controller may estimate a packet transmission/reception time with the specific BS based on a time point of reception of the failure prediction result by which the specific terminal is recognized, determine whether the specific terminal can receive the downlink packet in the first time interval when the downlink packet is retransmitted based on a time point of reception of an uplink packet of the specific terminal, the predetermined time, and the packet transmission/reception time, and wait for a predetermined standby time until entry into a second time interval of the specific terminal and reselect the BS for the specific terminal, when the specific terminal cannot receive the downlink packet based on the determination result.

Specifically, the controller may reselect the BS for the specific terminal without standby by setting the predetermined standby time as 0 when the specific terminal can receive the downlink packet based on a result of the determination.

Specifically, when the specific terminal can receive the downlink packet based on a result of the determination but there is no BS that can be reselected for the specific terminal, the controller may wait for the predetermined standby time until entry into the second time interval of the specific terminal and then reselects the BS for the specific terminal.

Specifically, the controller may reselect a BS having the best channel state (Signal to Noise Ratio (SNR)) with the specific terminal from BSs that have received an uplink packet of the specific terminal and transmitted the uplink packet to the network device.

In accordance with another aspect of the present disclosure, a method of operating a network device is provided. The method includes: a packet transmission step of transmitting a downlink packet, which is to be transmitted to a terminal, to a Base Station (BS) for packet transmission/reception to/from each terminal; a recognition step of recognizing a specific terminal predicted to fail to transmit the downlink packet in a specific BS; and a reselection step of, when the specific terminal is recognized, reselecting a BS for the specific terminal and retransmitting the downlink packet of the specific terminal to the reselected BS after waiting for a predetermined standby time based on the time point at which the specific terminal is recognized.

Specifically, after transmitting an uplink packet, the specific terminal can receive a downlink packet for the uplink packet in the unit of predetermined time intervals a particular number of times, and the reselection step may include estimating a packet transmission/reception time with the specific BS based on the time point of reception of a failure prediction result by which the specific terminal is recognized, determining whether the specific terminal can receive the downlink packet in a first time interval corresponding to one of the particular number of times in retransmission of the downlink packet based on the time point of reception of the uplink packet of the specific terminal, the predetermined time, and the packet transmission/reception time, and when the specific terminal cannot receive the downlink packet, waiting for a predetermined standby time until entry into a second time interval of the specific terminal and then reselecting the BS for the specific terminal.

Specifically, when the specific terminal can receive the downlink packet based on the result of the determination, the reselection step may include reselecting the BS for the specific terminal without standby by setting the predetermined standby time to 0.

Specifically, when the specific terminal can receive the downlink packet based on the result of the determination but there is no BS that can be reselected for the specific terminal, the reselection step may include waiting for the predetermined standby time until entry into the second time interval of the specific terminal and then reselecting the BS for the specific terminal.

In accordance with another aspect of the present disclosure, a Base Station (BS) device for transmitting/receiving a packet between a terminal and a network device is provided. a prediction unit configured to identify whether there is a specific terminal predicted to fail to transmit a downlink packet during a process of transmitting a downlink packet, which has been received from the network device, to the terminal; and a failure prediction result provision unit configured to, when the specific terminal is identified, provide a failure prediction result for the specific terminal to the network device.

Specifically, when the BS device receives the downlink packet of one terminal from the network device while the BS device transmits the downlink packet to another terminal and then occupies frequency resources for transmission of the next downlink packet, the prediction unit may identify the one terminal as the specific terminal predicted to fail to transmit the downlink packet.

According to the present disclosure, it is possible to derive an effect of improving the quality of an IoT service by increasing the success rate of reception of a downlink packet transmitted to an IoT terminal.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
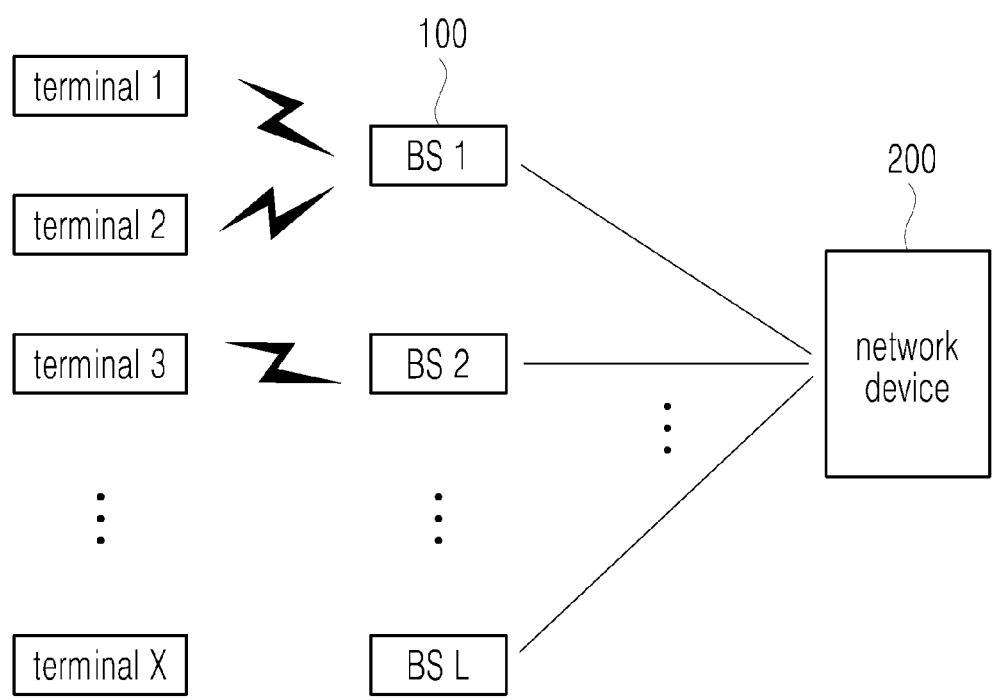
FIG. 1 illustrates an IoT network structure to which the present disclosure is applied.

It should be noted that the technical terms as used herein are merely used for describing particular embodiments, and are not intended to limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

In addition, a singular expression used in the specification includes a plural expression as long as they are clearly distinguished in the context. In the present disclosure, the term "comprise" or "include" should not be construed as necessarily including all of various elements or various steps disclosed herein, and it should be understood that some of the elements or steps may not be included, or additional elements or steps may be further included.

In addition, although terms including ordinal numbers such as first, second, and the like may be used to describe various elements, the elements should not be restricted by the terms. The terms are used merely for the purpose to distinguish an element from the other elements. For example, a first element may be termed a second element, and similarly, a second element may be termed a first element without departing from the scope of the present disclosure.

Hereinafter, embodiments of the present disclosure will be described in detail with reference to the accompanying drawings, equal or similar elements are assigned an equal reference numeral, and an overlapping description thereof will be omitted.

Further, in the following description of the technology of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the technical idea should not be construed as being limited by the accompanying drawings.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

Hereinafter, embodiments of the present disclosure will be described with reference to the accompanying drawings.

FIG. 1 illustrates the structure of an Internet-of-Things (IoT) network to which the present disclosure is applied.

As illustrated in FIG. 1, the structure of the IoT network includes remote IoT terminals (for example, terminals 1, 2, . . . X), a customer terminal (not shown) with an IoT app installed for identifying data of the remote IoT terminals and controlling the IoT terminals, a network device 200 (IoT app server) for connecting the IoT terminal and the customer terminal (IoT app) through a wired/wireless network, and gateways (for example, Base Stations (BSs) 1, 2, . . . L) for performing packet transmission/reception between the IoT terminal and the network device 200.

The quality of the IoT service provided in the structure of the IoT network is influenced by the success rate of reception of uplink packets/downlink packets transmitted/received among three nodes, namely the IoT terminal, BS, and network device.

When the IoT terminal transmits an uplink packet to the network device, the IoT terminal transmits the uplink packet in a broadcast manner, and a plurality of BSs receive the uplink packet and transmit the uplink packet to the network device, and thus it may be considered that the success rate of reception of the uplink packet is high.

However, when the network device transmits a downlink packet to the IoT terminal, the network device transmits the downlink packet to one BS preselected for the IoT terminal, and the one BS, having received the downlink packet, transmits the downlink packet to the IoT terminal.

At this time, if the BS transmits a downlink packet to another IoT terminal or occupies frequency resources for transmission, the BS recognizes it as downlink packet collision, drops the downlink packet, and does not transmit the downlink packet to the IoT terminal, and thus failure to receive the downlink packet occurs.

However, the current IoT technology has not presented a separate method of solving the problem of downlink collision recognized by the BS.

Accordingly, the present disclosure increases the success rate of reception of the downlink packet transmitted to the IoT terminal by proposing a new method of solving the problem of downlink packet collision recognized by the BS.

More specifically, the present disclosure proposes a BS device and a network device for implementing a new method of solving the problem of downlink packet collision.

Figure 2:
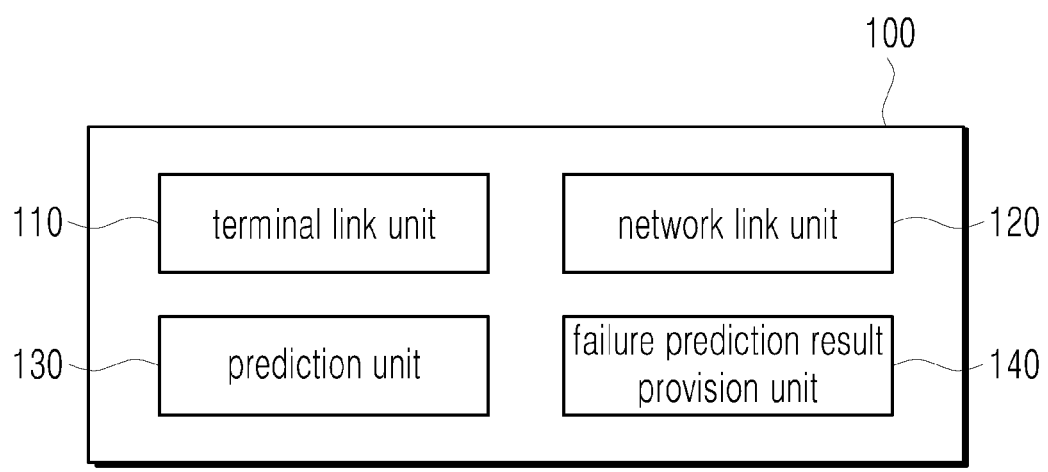
FIG. 2 is a block diagram illustrating the configuration of a BS device according to an embodiment of the present disclosure.

Hereinafter, the BS device according to an embodiment of the present disclosure will be first described in detail with reference to FIG. 2.

A BS device 100 according to the present disclosure may be one of BSs 1, 2, . . . L as the gateway illustrated in FIG. 1, and it is assumed that the BS device 100 is BS 1 for convenience of description.

Further, for convenience of description, terminals 1, 2, . . . X, as the IoT terminals and the network device 200 illustrated in FIG. 1, will be described.

The BS device 100 according to the present disclosure serves as a gateway in the IoT network and includes a terminal link unit 110 and a network link unit 120.

The terminal link unit 110 receives an uplink packet transmitted in a broadcast manner by a terminal (for example, terminal 1) within the coverage of the BS device 100 and transfers the uplink packet to the network link unit 120.

The terminal link unit 110 transmits the downlink packet received from the network device 200 through the network link unit 120 to the corresponding terminal (for example, terminal 1).

The network link unit 120 transmits the uplink packet received from the terminal (for example, terminal 1) through the terminal link unit 110 to the network device 200.

The network link unit 120 transfers the downlink packet received from the network device 200 to the terminal link unit 110 thereby the downlink packet being transmitted to the corresponding terminal (for example, terminal 1).

The BS device 100 serves as a gateway that transmits/receives packets between the terminal (for example, terminal 1) as the IoT terminal, and the network device 200 through the terminal link unit 110 and the network link unit 120.

As described above, the BS device 100 serving as the gateway in the IoT network includes a prediction unit 130 and a failure prediction result provision unit 140 in order to implement the method of the present disclosure, which has been proposed in order to solve the problem of downlink packet collision.

The prediction unit 130 identifies whether there is a particular terminal which is predicted to fail to receive the downlink packet during a process of transmitting the downlink packet received from the network device 200 to the terminal.

First, the situation in which reception of the downlink packet fails when the downlink packet collides according to the prior art will be described with reference to FIG. 4.

The network device selects a BS for performing packet transmission/reception with each terminal.

For example, with respect to terminal 1 and terminal 2, when terminal 1 transmits an uplink packet in a broadcast manner, a plurality of BSs receiving the uplink packet transmits the uplink packet of terminal 1 to the network device.

At this time, the network device selects, as a BS for performing packet transmission/reception with terminal 1, the BS having the best channel state (Signal to Noise Ratio (SNR)) with terminal 1 among a plurality of BSs providing (transmitting) the uplink packet of terminal 1.

Similarly, the network device selects, as a BS for performing packet transmission/reception with terminal 2, the BS having the best channel state (SNR) with terminal 2 among a plurality of BSs providing (transmitting) the uplink packet of terminal 2.

Figure 4:
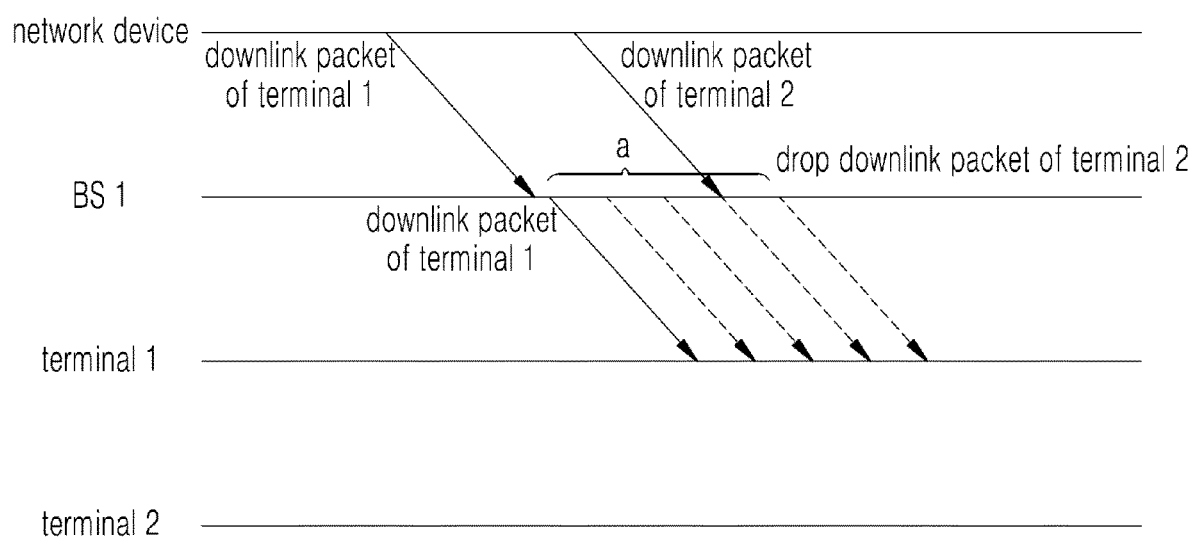
FIG. 4 illustrates the situation in which reception of a downlink packet fails due to downlink packet collision according to the prior art.

It is assumed that both terminal 1 and terminal 2 select BS 1 based on the result of selection of the BS by the network device for each of terminal 1 and terminal 2 in FIG. 4.

When a downlink packet to be transmitted to terminal 1 is generated for the uplink packet of terminal 1, the network device transmits the downlink packet of terminal 1 to BS 1.

Then, BS 1 may transmit the downlink packet of terminal 1, received from the network device, to terminal 1.

At this time, after transmitting the downlink packet of terminal 1 to terminal 1, BS 1 occupies frequency resources for a predetermined time (a) in order to transmit the next downlink packet of terminal 1.

As described above, the reason why BS 1 occupies frequency resources for the predetermined time (a) is based on the following two grounds.

First, the terminal (IoT terminal) is classified into several types in terms of downlink packet reception schemes according to the time at which the downlink packet can be received in the IoT network. One of the several types is a type (hereinafter, referred to as a type A) for supporting low power in which the downlink packet corresponding to the uplink packet can be received a particular number of times (for example, two times) in a predetermined time interval (for example, one second) after the uplink packet is transmitted.

When it is assumed that the predetermined time is one second and that the particular number of times is two times, after the uplink packet is transmitted, the terminal (IoT terminal) operating in the type A can receive the downlink packet in a first time interval (RX1) one second after the time point at which the uplink packet is transmitted, and can receive the downlink packet in a second time interval (RX2) one second after the time point at which the first time interval (RX1) ends.

Terminals (IoT terminal) used for IoT technology (Long Range (LoRa)) specialized in transmission of a small amount of data supporting transmission at a low speed (<1 kbps) and low power in a wide coverage area are mainly adopted/performed in the type A.

Second, since there is a physical distance between the network device and the BS, which is the gateway, transmission time corresponding to the physical distance is taken.

Particularly, in an IoT network, that is, a LoRa network to which IoT technology (LoRa) specialized in wide coverage/ low-speed transmission (<1 kbps)/low-power transmission/transmission of a small amount of data is applied, the physical distance between the network device and the BS is long, and thus the transmission time may also be long.

Accordingly, the terminal (IoT terminal) operating the type A has the limitation on the time interval and the number of times the downlink packet is received due to factor 1, and the physical distance between the network device and the BS is long thereby the transmission time being long due to factor 2. Because of factor 1 and factor 2, after transmitting the downlink packet of terminal 1, BS 1 preferentially occupies frequency resources for the predetermined time (a) in order to transmit the next downlink packet of terminal 1, if necessary, in order to allow the terminal to necessarily receive the downlink packet in a limited number of times within a limited time interval if there is a downlink packet that should be transmitted to the terminal (IoT terminal).

Meanwhile, when the downlink packet to be transmitted to terminal 2 is generated for the uplink packet of terminal 2, the network device transmits the downlink packet of terminal 2 to BS 1.

Then, BS 1 is required to transmit the downlink packet of terminal 2, which has been received from the network device, to terminal 2.

However, if the downlink packet of terminal 2 is received during the predetermined time (a), in which the frequency resources are occupied for terminal 1, BS 1 recognizes it as downlink packet collision.

This is because the BS, which is the gateway in the IoT network, has restrictions in that the BS cannot simultaneously transmit the downlink packet to several terminals.

In the prior art, if BS 1 receives the downlink packet of terminal 2 during the predetermined time (a), in which BS 1 occupies frequency resources after transmitting the downlink packet to terminal 1, BS 1 recognizes it as downlink packet collision and drops the downlink packet of terminal 2.

Accordingly, when terminal 2 operates in the type A having the limitation on the time interval of the predetermined time (for example, one second) and the number of times (for example, two times) in reception of the downlink packet, terminal 2 cannot receive the downlink packet within the first time interval (RX1) for the uplink packet after transmitting the uplink packet.

The configuration of the BS device 100 according to the present disclosure will be described in detail with reference to FIG. 2.

The prediction unit 130 identifies whether there is a particular terminal which is predicted to fail to receive the downlink packet during a process of transmitting the downlink packet received from the network device 200 to the terminal.

Hereinafter, the following description will be made in more detail based on terminals 1 and 2.

When the BS device 100 receives a downlink packet of another terminal, for example, terminal 2, from the network device 200 while occupying frequency resources for a time (a) after transmitting a downlink packet to a predetermined terminal, for example, terminal 1, the prediction unit 130 may determine that terminal 2 is a specific terminal predicted to fail to receive the downlink packet.

When the prediction unit 130 makes a determination with respect to the specific terminal, the failure prediction result provision unit 140 provides a failure prediction result of the specific terminal to the network device 200.

That is, when terminal 2 is determined to be the specific terminal as described above, the failure prediction result provision unit 140 provides a failure prediction result (TxACK) of terminal 2 to the network device 200 immediately after the determination.

Figure 5:
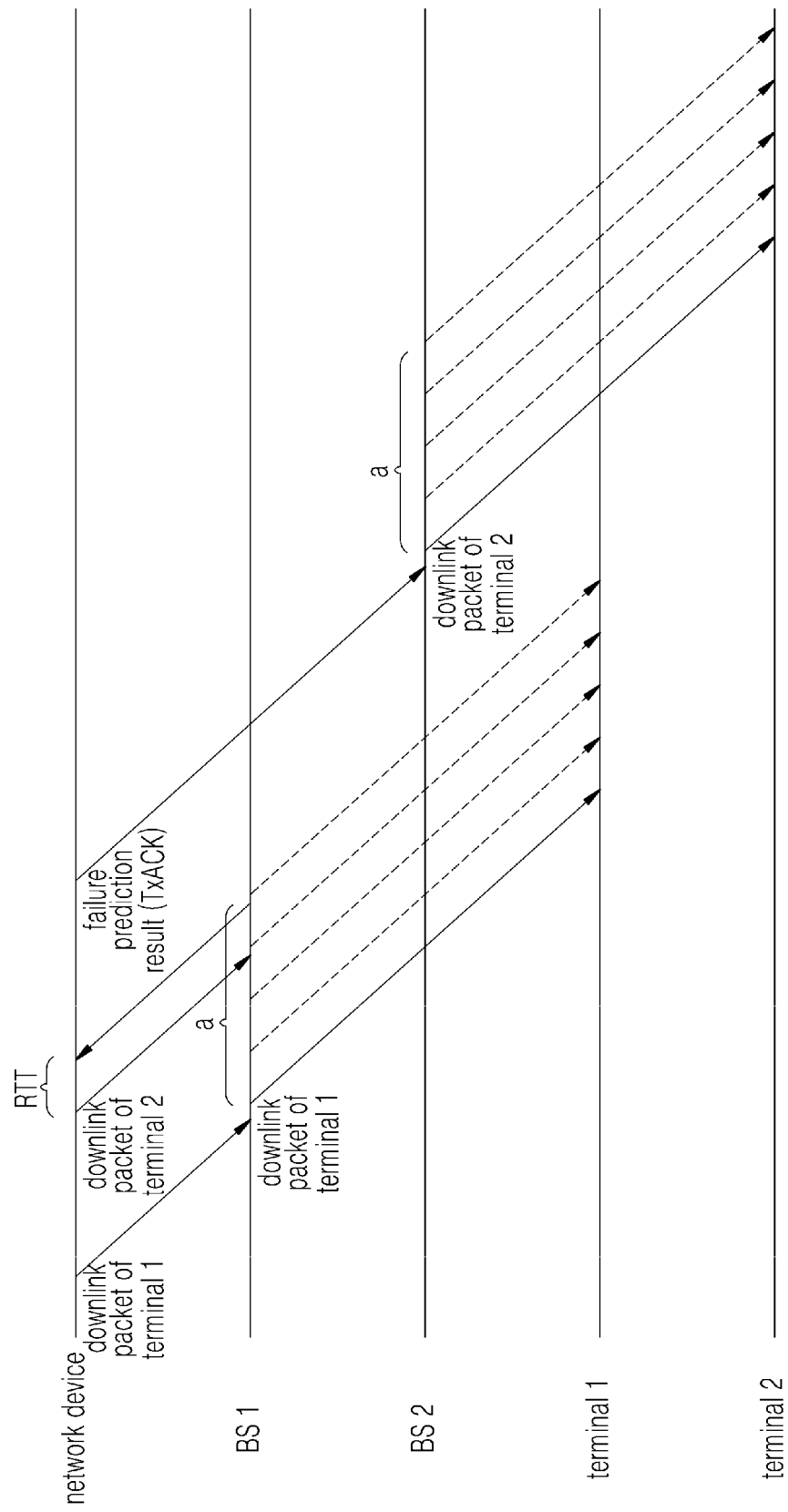
FIGS. 5 and 6 illustrate situations in which reception of a downlink packet is successful in spite of downlink packet collision according to the present disclosure.

Referring to FIG. 5, the BS device 100 (BS 1) provides the failure prediction result (TxACK) of terminal 2 to the network device 200 at the time point at which downlink packet collision is recognized by receiving the downlink packet of terminal 2 while occupying frequency resources during the time (a) after transmitting the downlink packet to terminal 1, that is, the time point at which terminal 2 is identified.

As described above, the BS device 100 according to the present disclosure may provide the failure prediction result (TxACK) of terminal 2 to the network device 200 instead of dropping the downlink packet of terminal 2 at the time point of recognizing downlink packet collision, thereby allowing the network device 200 to recognize terminal 2, which is predicted to fail to receive the downlink packet, before the time point at which failure to receive the downlink packet of terminal 2 is identified.

Figure 3:
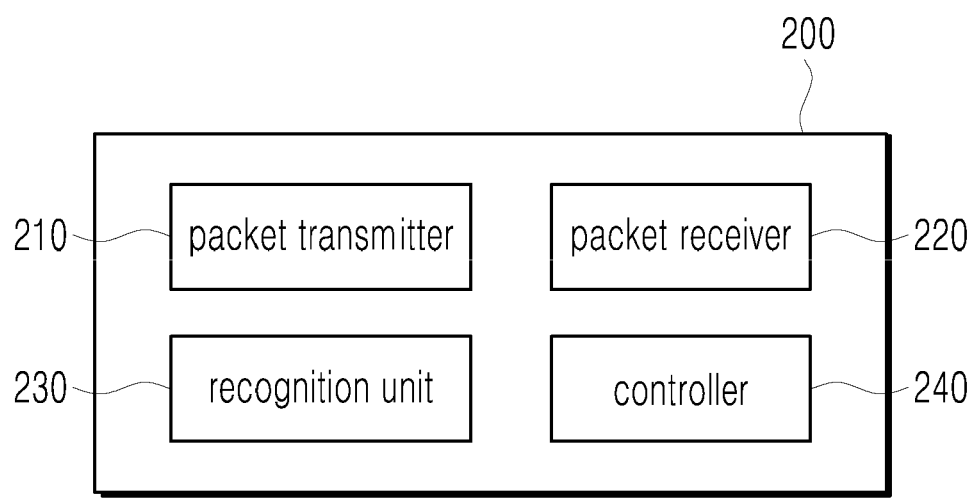
FIG. 3 is a block diagram illustrating the configuration of a network device according to an embodiment of the present disclosure.

Hereinafter, the network device according to an embodiment of the present disclosure will be described in detail with reference to FIG. 3.

The network device 200 according to the present disclosure includes a packet transmitter 210 configured to transmit a downlink packet, which is to be transmitted to a terminal, to a BS selected for packet transmission/reception for each terminal, a recognition unit 220 configured to recognize a specific terminal predicted to fail to receive a downlink packet in the specific BS, and a controller 240 configured to, when the specific terminal is recognized, determine at least one of reselection of the BS and the time point of the reselection for packet transmission/reception for the specific terminal.

Further, the network device 200 includes a packet receiver 220 configured to receive an uplink packet.

The packet transmitter 210 transmits a downlink packet, which is to be transmitted to a terminal, to a BS selected for packet transmission/reception to/from each terminal.

As described above, the network device 200, for example, the controller 240, selects, as the BS for packet transmission/reception to/from the terminal, the BS having the best channel state (SNR) with the terminal among a plurality of BSs providing (transmitting) an uplink packet of the terminal.

For example, with respect to terminal 1 and terminal 2, when terminal 1 transmits an uplink packet in a broadcast manner, a plurality of BSs 1, 2, and 3 receiving the uplink packet transmit the uplink packet of terminal 1 to the network device 200.

Further, when terminal 2 transmits the uplink packet in a broadcast manner, the plurality of BSs 1, 2, and 3 receiving the uplink packet transmit the uplink packet of terminal 2 to the network device 200.

The controller 240 selects, as the BS for packet transmission/reception to/from terminal 1, the BS having the best channel state (SNR) with the terminal among the plurality of BSs 1, 2, and 3 providing (transmitting) the uplink packet of terminal 1.

Further, the controller 240 selects, as the BS for packet transmission/reception to/from terminal 2, the BS having the best channel state (SNR) with the terminal among the plurality of BSs 1, 2, and 3 providing (transmitting) the uplink packet of terminal 2.

Hereinafter, for convenience of description, it is assumed that both terminal 1 and terminal 2 select BS 1 based on the result of selection of the BS for each of terminal 1 and terminal 2 by the network device 200.

In this case, when a downlink packet to be transmitted to terminal 1 is generated for the uplink packet of terminal 1, the packet transmitter 210 transmits the downlink packet to BS 1 in the time interval of the downlink packet of terminal 1, that is, a first time interval (RX1).

Hereinafter, for convenience of description, the downlink packet transmitted in the first time interval (RX1) is defined as a downlink packet (RX1).

Further, when a downlink packet to be transmitted to terminal 2 is generated for the uplink packet of terminal 2, the packet transmitter 210 transmits the downlink packet (RX1) to BS 1 in a time interval of the downlink packet of terminal 2, that is, the first time interval (RX1).

The recognition unit 230 recognizes a specific terminal that is predicted to fail to receive the downlink packet from a specific BS.

Here, the specific terminal may be a terminal that can receive the downlink packet for the uplink packet in a predetermined time interval (for example, one second) and a particular number of times (for example, two times) after transmitting the uplink packet, that is, a terminal operating in the type A, having a limitation on the time interval and the number of times the downlink packet is received, as described above.

Further, when a failure prediction result predicting failure of transmission of the downlink packet (RX1) is received from the specific BS for a terminal, the recognition unit 230 recognizes the terminal as the specific terminal. The downlink packet (RX1) is transmitted in the first time interval (RX1), which corresponds to one of the particular number of times (for example, two times) for the uplink packet received through the specific BS.

Specifically, among BSs 1, 2, ... L receiving the downlink packet of the terminal from the network device 200 and transmitting the downlink packet to the corresponding terminal, there is a BS receiving the downlink packet of another terminal (for example, terminal 2) during the time (a) in which frequency resources for transmission of the next downlink packet are occupied after the downlink packet is transmitted to the terminal (for example, terminal 1) and thus recognizing downlink packet collision, and the corresponding BS provides a failure prediction result (TxACK) for the terminal (for example, terminal 2) that is predicted to fail to receive the downlink packet to the network device 200.

As known from the above, the specific BS is a BS that recognizes the downlink packet collision and provides the failure prediction result (TxACK) to the network device 200.

When receiving the failure prediction result (TxACK) for the terminal (for example, terminal 2) from the specific BS (for example, BS 1), the recognition unit 230 may recognize the terminal (for example, terminal 2) predicted to fail to receive the downlink packet from the specific BS (for example, BS 1) before the time point at which actual failure to receive the downlink packet is identified in the terminal (for example, terminal 2).

Hereinafter, for convenience of description, terminal 2 according to the above example will be described as the specific terminal predicted to fail to receive the downlink packet.

When terminal 2 is recognized as the specific terminal, the controller 240 determines at least one of reselection of the BS and the time point of reselection for packet transmission/reception to/from terminal 2.

That is, the controller 240 may determine whether to reselect the BS for packet transmission/reception to/from terminal 2, predicted to fail to receive the downlink packet from BS 1, determine the time point of reselection of the BS, or determine whether to reselect the BS and the time point of reselection when it is determined to reselect the BS.

The functionality of the controller 240 according to an embodiment of the present disclosure will be described below.

For terminal 2, predicted to fail to receive the downlink packet from BS 1, the controller 240 reselects the BS and retransmits the downlink packet (RX1), which is to be transmitted to terminal 2, to the reselected BS.

At this time, the controller 240 may reselect the BS having the best channel state (SNR) with terminal 2 among BSs 1, 2, and 3 receiving the uplink packet of terminal 2 and transmitting the uplink packet to the network device 200 other than the specific BS, that is, BS 1, which was selected previously.

That is, since failure to receive the downlink packet of terminal 2 is predicted for BS 1, which was selected previously, the controller 240 reselects the BS having the best channel state (SNR) with terminal 2 from among the remaining BSs 2 and 3 except for BS 1 among BSs 1, 2, and 3 receiving the uplink packet of terminal 2 and transmitting the uplink packet to the network device 200.

Hereinafter, for convenience of description, BS 2 is reselected.

Accordingly, the controller 240 retransmits the downlink packet (RX1), which is to be transmitted to terminal 2, to the reselected BS 2.

Then, BS 2 transmits the downlink packet (RX1) of terminal 2, which has been received from the network device 200, to terminal 2.

Meanwhile, since terminal 2 operates in the type A, having a limitation on the time interval (for example, one second) and the number of times (for example, two times) in reception of the downlink packet as described above, if terminal 2 cannot receive the downlink packet in the first time interval (RX1) even though the downlink packet (RX1) is retransmitted to terminal 2, retransmission of the downlink packet (RX1) is not needed.

Accordingly, in the present disclosure, it is possible to determine whether to reselect the BS according to whether it is required to retransmit the downlink packet.

That is, in the present disclosure, the BS is reselected and the downlink packet is retransmitted only when it is required to retransmit the downlink packet.

Specifically, the controller 240 estimates a packet transmission/reception time (RTT) with BS 1 based on the time point (B) of transmission of the downlink packet (RX1) transmitted in the first time interval (RX1) of the specific terminal, for example, terminal 2, and the time point (C) of reception of the failure prediction result (TxACK) for terminal 2 from BS 1.

For example, as illustrated in FIG. 5, it is possible to calculate and estimate the packet transmission/reception time (RTT) between the network device 200 and BS 1 by subtracting the time point (B) of transmission of the downlink packet (RX1) of terminal 2 from the time point (C) of reception of the failure prediction result (TxACK).

Further, the controller 240 determines whether to reselect the BS for terminal 2 based on the estimated packet transmission/reception time (RTT).

Specifically, the controller 240 determines whether terminal 2 can receive the downlink packet (RX1) in the first time interval (RX1) when the downlink packet is retransmitted based on the time point (A) of reception of the uplink packet of terminal 2, the predetermined time (for example, one second) of the type A adopted by terminal 2, and the estimated packet transmission/reception time (RTT).

For example, when the downlink packet is retransmitted to terminal 2, the time for receiving the retransmitted downlink packet by terminal 2 may be predicted as half (RTT/2) of the estimated packet transmission/reception time to (RTT).

Accordingly, it is possible to calculate the maximum time limit within which the downlink packet (RX1) can be received after terminal 2 transmits the uplink packet by adding the time point (A) of reception of the uplink packet of terminal 2 and the predetermined time (for example, one second) of the type A is adopted by terminal 2 (A+1).

The remaining time within which terminal 2 can receive the downlink packet (RX1) may be calculated by subtracting the current time point from the maximum time limit (A+1) within which the downlink packet (RX1) can be received from transmission of the uplink packet.

When the remaining time ((A+1)-current time point) obtained by subtracting the current time point from the maximum time limit (A+1) is longer than RTT/2, the controller 240 may determine that terminal 2 can receive the downlink packet (RX1) in the first time interval (RX1) when the downlink packet is retransmitted.

When it is determined that terminal 2 can receive the downlink packet (RX1) in the first time interval (RX1) for retransmission of the downlink packet (when retransmission is required), the controller 240 determines to reselect the BS for terminal 2, reselects the BS (from BS 1 to BS 2), and retransmits the downlink packet (RX1), which is to be transmitted to terminal 2, to the reselected BS 2.

As illustrated in FIG. 5, the network device 200 according to the present disclosure may retransmit the downlink packet (RX1) of terminal 2 to the reselected BS 2 if terminal 2 can receive the downlink packet (RX1) in the first time interval (RX1) when the downlink packet (RX1) is retransmitted, where terminal 2 is predicted to fail to receive the downlink packet due to downlink packet collision since the network device 200 transmits the downlink packet to BS 1.

Then, BS 2 may transmit the downlink packet (RX1) of terminal 2, which has been received from the network device 200, to terminal 2, and terminal 2 may receive, from BS 2, the downlink packet (RX1) from the network device 200 within the first time interval (RX1).

If BS 2, which is reselected for terminal 2, occupies frequency resources for another terminal and thus downlink packet collision is recognized again, BS 2 also provides the failure prediction result (TxACK) for terminal 2 to the network device 200.

In this case, if terminal 2 can receive the downlink packet (RX1) in the first time interval (RX1) when the downlink packet (RX1) is retransmitted (when retransmission is required), the network device 200 may repeat the determination of the BS reselection, reselection of the BS, and retransmission of the downlink packet (RX1).

Meanwhile, the functionality of the controller 240 according to another embodiment of the present disclosure will be described in detail.

When BS 1 recognizes terminal 2, which is predicted to fail to receive the downlink packet, the controller 240 reselects the BS for terminal 2 and retransmits the downlink packet of terminal 2 after waiting for a predetermined standby time based on the time point at which terminal 2 is recognized.

That is, the controller 240 differently determines time points of reselection of the BS by differently applying the predetermined standby time for delaying the reselection of the BS for terminal 2 and the retransmission of the downlink packet according to the time point at which terminal 2 is recognized, that is, the time point at which the failure prediction result (TxACK) for terminal 2 is received.

Specifically, the controller 240 estimates a packet transmission/reception time for BS 1 based on the time point of reception of the failure prediction result at which terminal 2 is recognized.

The controller 240 estimates a packet transmission/reception time (RTT) with BS 1 based on the time point (B) of transmission of the downlink packet (RX1) transmitted in the first time interval (RX1) of the specific terminal, for example, terminal 2, and the time point (C) of reception of the failure prediction result (TxACK) for terminal 2 from BS 1.

Figure 6:
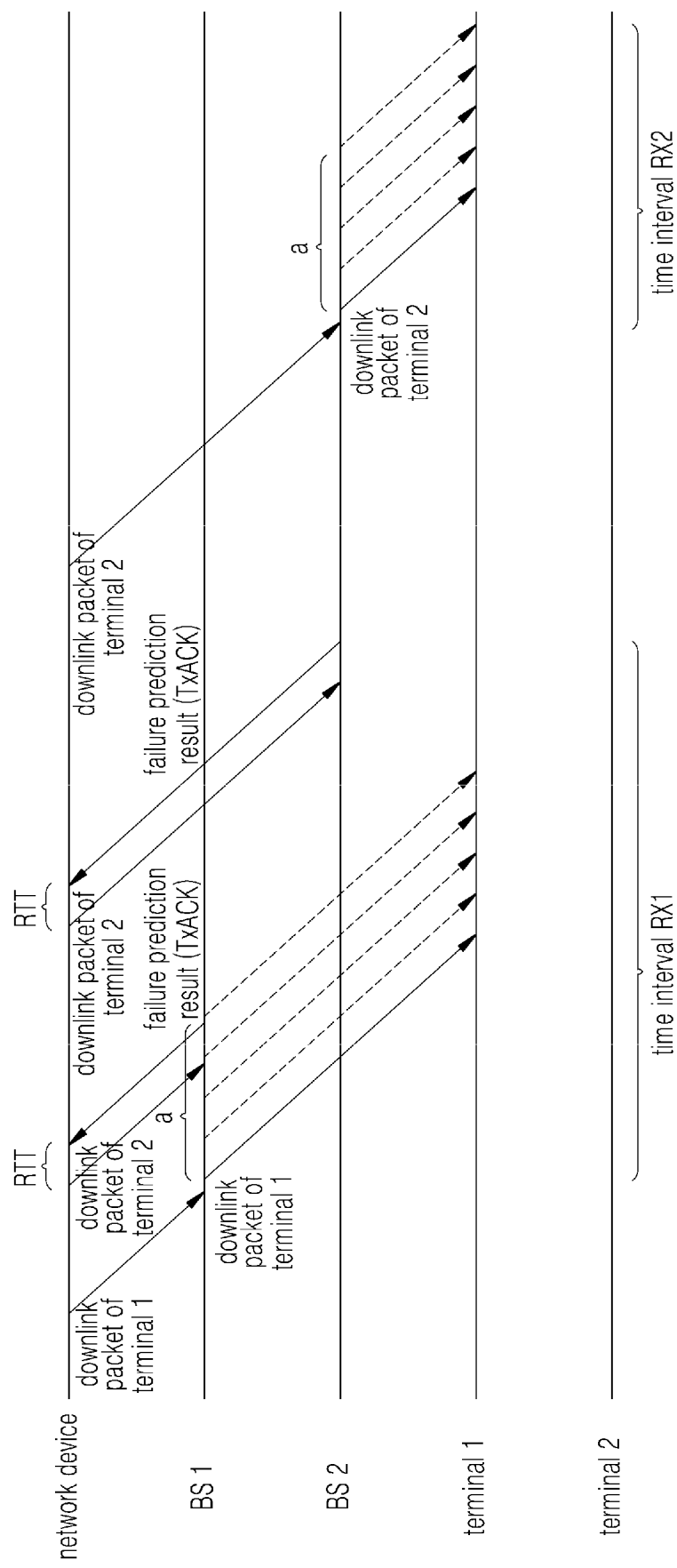

For example, as illustrated in FIG. 6, it is possible to calculate and estimate the packet transmission/reception time (RTT) between the network device 200 and BS 1 by subtracting the time point (B) of transmission of the downlink packet (RX1) of terminal 2 from the time point (C) of reception of the failure prediction result (TxACK).

Further, the controller 240 determines whether terminal 2 can receive the downlink packet (RX1) in the first time interval (RX1) when the downlink packet is retransmitted based on the time point (A) of reception of the uplink packet of terminal 2, the predetermined time (for example, one second) of the type A adopted by terminal 2, and the estimated packet transmission/reception time (RTT).

For example, when the downlink packet is retransmitted to terminal 2, the time for terminal 2 receiving the retransmitted downlink packet may be predicted as half (RTT/2) of the estimated packet transmission/reception time (RTT).

Accordingly, it is possible to calculate a maximum time limit within which the downlink packet (RX1) can be received after terminal 2 transmits the uplink packet by adding the time point (A) of reception of the uplink packet of terminal 2 and the predetermined time (for example, one second) of the type A adopted by terminal 2 (A+1).

The remaining time within which terminal 2 can receive the downlink packet (RX1) may be calculated by subtracting the current time point from the maximum time limit (A+1) within which the downlink packet (RX1) can be received from transmission of the uplink packet.

When the remaining time ((A+1)-current time point), obtained by subtracting the current time point from the maximum time limit (A+1), is longer than RTT/2, the controller 240 may determine that terminal 2 can receive the downlink packet (RX1) in the first time interval (RX1) when the downlink packet is retransmitted.

When terminal 2 can receive the downlink packet (RX1) in the first time interval (RX1) based on the determination result, the controller 240 reselects the BS for terminal 2 and retransmits the downlink packet of terminal 2 without any standby by setting the predetermined standby time to 0.

That is, when it is determined that terminal 2 can receive the downlink packet (RX1) in the first time interval (RX1) in retransmission of the downlink packet based on the time point (time point of reception of the failure prediction result) at which terminal 2 predicted to fail to receive the downlink packet is recognized, the network device 200 according to the present disclosure immediately (predetermined standby time=0) reselects the BS for terminal 2 and retransmits the downlink packet.

At this time, since failure to receive the downlink packet of terminal 2 is predicted through BS 1, which has been selected previously, the controller 240 reselects the BS having the best channel state (SNR) with terminal 2 from the remaining BSs 2 and 3 other than BS 1 among BSs 1, 2, and 3 receiving the uplink packet of terminal 2 and transmitting the uplink packet to the network device 200.

Hereinafter, for convenience of description, BS 2 is reselected.

The controller 240 reselects the BS (from BS 1 to BS 2) for terminal 2 as described above and retransmits the downlink packet (RX1), which is to be transmitted to terminal 2, to the reselected BS 2.

As illustrated in FIG. 6, the network device 200 according to the present disclosure may retransmit the downlink packet (RX1) of terminal 2 to the reselected BS 2 if terminal 2 can receive the downlink packet (RX1) in the first time interval (RX1) when the downlink packet (RX1) is retransmitted, where terminal 2 is predicted to fail to receive the downlink packet due to downlink packet collision since the network device 200 transmits the downlink packet to BS 1, Then, BS 2 may transmit the downlink packet (RX1) of terminal 2, which has been received from the network device 200, to terminal 2, and terminal 2 may receive, from BS 2, the downlink packet (RX1) from the network device 200 within the first time interval (RX1).

If BS 2, which is reselected for terminal 2, occupies frequency resources for another terminal and thus downlink packet collision is recognized again, BS 2 also provides the failure prediction result (TxACK) for terminal 2 to the network device 200, as illustrated in FIG. 6.

Then, the controller 240 estimates a packet transmission/reception time (RTT) with BS 2 based on the time point (C) at which the failure prediction result (TxACK) is received for terminal 2 from BS 2.

Further, the controller 240 determines whether terminal 2 can receive the downlink packet (RX1) in the first time interval (RX1) when the downlink packet is retransmitted by determining whether the remaining time ((A+1)-current time point) obtained by subtracting the current time point from the maximum time limit (A+1) is longer than RTT/2.

When terminal 2 can receive the downlink packet (RX1) in the first time interval (RX1) in retransmission of the downlink packet, the controller 240 reselects the BS for terminal 2 and retransmits the downlink packet of terminal 2 without any standby by setting the predetermined standby time as 0.

At this time, since failure to receive the downlink packet of terminal 2 is predicted through BSs 1 and 2, which have been selected previously, the controller 240 may reselect BS 3, which is the one remaining BS except for BSs 1 and 2 among BSs 1, 2, and 3 receiving the uplink packet of terminal 2 and transmitting the uplink packet to the network device 200.

Meanwhile, even though terminal 2 can receive the downlink packet (RX1) in the first time interval (RX1) when the downlink packet is retransmitted, there may be no BS that can be reselected for terminal 2.

For example, although a plurality of BSs 1, 2, and 3 providing (transmitting) the uplink packet of terminal 2 are selected in the order of BS 1, BS 2, and BS3, that is, in the order from the BS having the best channel state (SNR) with the terminal, and the selected BS transmits the downlink packet (RX1) of terminal 2, all of BS 1, 2, and 3 may predict failure to receive the downlink packet of terminal 2.

In this case, even though terminal 2 can receive the downlink packet (RX1) in the first time interval (RX1) when the downlink packet is retransmitted, there may be no BS that can be reselected for terminal 2.

As described above, when there is no BS that can be reselected for terminal 2 even though terminal 2 can receive the downlink packet (RX1) in the first time interval (RX1) in retransmission of the downlink packet, the controller 240 reselects the BS for terminal 2 and retransmits the downlink packet (RX2) of terminal 2 after waiting for the predetermined standby time until the time point of entry into the second time interval (RX2) of terminal 2.

As described above, terminal 2 operates in the type A, in which terminal 2 can receive the downlink packet for the uplink packet in a predetermined time interval (for example, one second) a particular number of times (for example, two times) after transmitting the uplink packet.

After transmitting the uplink packet, terminal 2 can receive the downlink packet in the first time interval (RX1), corresponding to one second, and can receive the downlink packet in the second time interval (RX2), corresponding to one second, after the first time interval (RX1) ends. At this time, the first time interval (RX1) and the second time interval (RX2) may be connected to each other or separated from each other by a predetermined time interval therebetween.

Hereinafter, for convenience of description, the downlink packet transmitted in the second time interval (RX2) after standby for a predetermined standby time until the time point of entry into the second time interval (RX2) of terminal 2 is defined as the downlink packet (RX2).

That is, when it is determined that retransmission of the downlink packet is not possible since there is no long any BS that can be reselected based on the time point at which terminal 2, which is predicted to fail to receive the downlink packet, is recognized (the time point of reception of the failure prediction result), the network device 200 according to the present disclosure waits for the predetermined standby time until entry into the second time interval (RX2), in which the condition (occupation of frequency resources) of the BS is improved, and thus the BS reselection is possible without unnecessarily performing reselection of the BS for terminal 2 and retransmission of the downlink packet.

Meanwhile, when terminal 2 cannot receive the downlink packet (RX1) in the first time interval (RX1) based on the result of the determination about the reception of the downlink packet (RX1) for retransmission of the downlink packet, the controller 240 reselects the BS for terminal 2 and retransmits the downlink packet (RX2) of terminal 2 after waiting for the predetermined standby time until the time point of entry into the second time interval (RX2) of terminal 2.

At this time, when terminal 2 cannot receive the downlink packet (RX1) in the first time interval (RX1) in retransmission of the downlink packet, it is considered that the first time interval (RX1) of terminal 2 ends.

That is, when it is determined that the first time interval (RX1) of terminal 2 ends based on the time point at which terminal 2, which is predicted to fail to receive the downlink packet, is recognized (the time point of reception of the failure prediction result), terminal 2 cannot receive the downlink packet even though the downlink packet is retransmitted, so that the network device 200 according to the present disclosure postpones reception until the second time interval (RX2), in which terminal 2 can receive the downlink packet without unnecessarily reselecting the BS for terminal 2 and retransmitting the downlink packet.

At this time, the controller 240 may reselect the BS having the best channel state (SNR) with terminal 2 among BSs 1, 2, and 3, which have received the uplink packet of terminal 2 and transmitted the uplink packet to the network device 200.

That is, since the network device 200 has waited for a predetermined standby time until entry into the second time interval (RX2) of terminal 2, the controller 240 may reselect the BS having the best channel state (SNR) with terminal 2 among all of BSs 1, 2, and 3 without excluding the BSs which have been selected in the first time interval (RX1) of terminal 2, among BSs 1, 2, and 3.

Hereinafter, for convenience of description, BS 2 is reselected.

Then, BS 2 may transmit the downlink packet (RX2) of terminal 2, which has been received from the network device 200, to terminal 2, and terminal 2 may receive the downlink packet (RX2) from the network device 200 within the second time interval (RX2) despite failing to receive the downlink packet (RX1) in the first time interval (RX1).

As described above, during a process in which the BS device 100 according to the present disclosure transmits the downlink packet, which has been received from the network device 200, to the terminal (IoT terminal), that is, a process in which the BS device 100 serves as the gateway in the IoT network, the BS device 100 immediately informs the network device 200 of the terminal that is predicted to fail to receive the downlink packet when downlink packet collision is recognized, instead of dropping the downlink packet.

Further, unlike the conventional method, in which the BS never recognizes downlink packet reception failure due to downlink packet collision, the network device 200 according to the present disclosure may rapidly recognize the terminal (IoT terminal) that is predicted to fail to receive the downlink, determine whether retransmission is required, and, when retransmission is required, reselect the BS and retransmit the downlink packet.

Further, unlike the conventional method, in which the BS never recognizes downlink packet reception failure due to downlink packet collision, the network device 200 according to the present disclosure may rapidly recognize the terminal (IoT terminal) that is predicted to fail to receive the downlink packet and perform BS reselection and downlink retransmission at the time point of retransmission, determined based on the time point of recognition (immediately_first time interval (RX1) or after the predetermined standby time_second time interval (RX2)).

Accordingly, the present disclosure proposes a new method of solving downlink collision that the BS recognizes through a link between two nodes, namely the BS and the network device, thereby increasing the success rate of reception of downlink packets transmitted to the IoT terminal and thus deriving an effect of improving the quality of an IoT service.

Hereinafter, a method (scheme) of reselecting the BS that transmits the downlink packet according to an embodiment of the present disclosure will be described with reference to FIG. 7.

For convenience of description, terminals 1 and 2 and BSs 1 and 2 will be used similar to the above-described embodiment.

When terminal 1 transmits the uplink packet in a broadcast manner, the plurality of BSs 1, 2, and 3 receiving the uplink packet transmit the uplink packet of terminal 1 to the network device 200 in S1.

Further, when terminal 2 transmits the uplink packet in a broadcast manner, the plurality of BSs 1, 2, and 3 receiving the uplink packet transmit the uplink packet of terminal 2 to the network device 200 in S2.

The network device 200 selects, as the BS for packet transmission/reception to/from terminal 1, the BS having the best channel state (SNR) with the terminal among the plurality of BSs 1, 2, and 3 providing (transmitting) the uplink packet of terminal 1 in S10.

Further, the network device 200 selects, as the BS for packet transmission/reception to/from terminal 2, the BS having the best channel state (SNR) with the terminal among the plurality of BSs 1, 2, and 3 providing (transmitting) the uplink packet of terminal 2 in S20.

Hereinafter, for convenience of description, it is assumed that both terminal 1 and terminal 2 select BS 1 based on the result of selection of the BS by the network device 200 for each of terminal 1 and terminal 2.

When a downlink packet to be transmitted to terminal 1 is generated for the uplink packet of terminal 1, the network device 200 transmits the downlink packet of terminal 1, that is, the downlink packet (RX1) in the first time interval (RX1) to BS 1 in S30 and S32.

Since BS 1 is not occupying frequency resources for another terminal when receiving the downlink packet (RX1) of terminal 1, BS 1 transmits the downlink packet (RX1) of terminal 1, which has been received from the network device 200, to terminal 1 in S34.

After transmitting the uplink packet, terminal 1 may receive, from BS 1, the downlink packet (RX1) from the network device 200 in the first time interval (RX1).

Meanwhile, when a downlink packet to be transmitted to terminal 2 is generated for the uplink packet of terminal 2, the network device 200 transmits the downlink packet of terminal 2, that is, the downlink packet (RX1), to BS 1 in the time interval (RX1) in S40 and S42.

At this time, as BS 1 receives the downlink packet (RX1) of terminal 2 while occupying frequency resources for terminal 1 during the time (a), BS 1 recognizes downlink packet collision and provides a failure prediction result (TxACK) for terminal 2, predicted to fail to receive the downlink packet, to the network device 200 in S44.

When receiving the failure prediction result (TxACK) for terminal 2 from BS 1, the network device 200 recognizes terminal 2, which is predicted to fail to receive the downlink packet, reselects the BS (from BS 1 to BS 2) for terminal 2 and retransmits the downlink packet (RX1) of terminal 2 to the reselected BS 2 in S50 and S52.

Since BS 2 is not occupying frequency resources for another terminal when receiving the downlink packet (RX1) of terminal 2, BS 2 transmits the downlink packet (RX1) of terminal 2, which has been received from the network device 200, to terminal 2 in S54.

After transmitting the uplink packet, terminal 2 may receive, from BS 2, the downlink packet (RX1) from the network device 200 in the first time interval (RX1).

Figure 9:
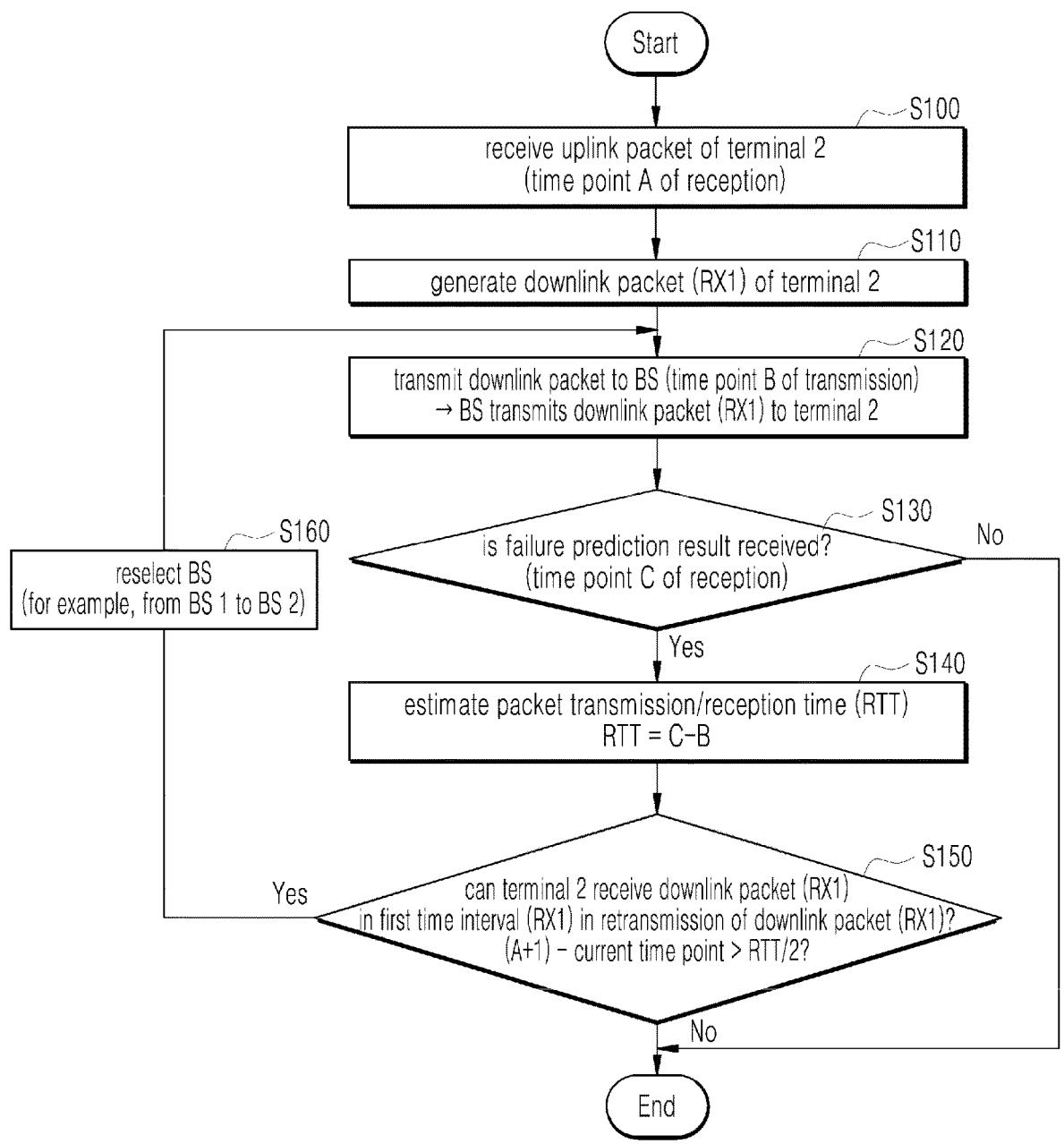
FIG. 9 is a flowchart illustrating a method of operating the network device according to an embodiment of the present disclosure.

Hereinafter, a method of operating the network device according to an embodiment of the present disclosure will be described with reference to FIG. 9.

The method of operating the network device 200 according to the present disclosure receives an uplink packet from the terminal through the BS.

Hereinafter, for convenience of description, terminal 2 will be used, similar to the above-described example.

That is, the method of operating the network device 200 according to the present disclosure receives an uplink packet from terminal 2, which is received through the BS in S100. Further, the time point at which the uplink packet of terminal 2 is received is referred to as a time point (A) of reception.

At this time, the method of operating the network device 200 according to the present disclosure selects, as the BS (for example, BS 1) for packet transmission/reception to/from terminal 2, the BS having the best channel state (SNR) with the terminal among a plurality of BSs 1, 2, and 3 providing (transmitting) the uplink packet of terminal 2.

Thereafter, when a downlink packet to be transmitted to terminal 2 for the uplink packet of terminal 2 is generated in S110, the downlink packet of terminal 2, that is, the downlink packet (RX1), is transmitted to the pre-selected BS 1 in the first time interval (RX1) in S120 in the method of operating the network device 200 according to the present disclosure. At this time, the time point at which the downlink packet (RX1) of terminal 2 is transmitted is referred to as the time point (B) of transmission.

BS 1 is required to transmit the downlink packet (RX1) of terminal 2, which has been received from the network device 200, to terminal 2.

However, when BS 1 receives the downlink packet of terminal 2 during a predetermined time (a) in which BS 1 occupies frequency resources for terminal 1, BS 1 recognizes it as downlink packet collision and provides a failure prediction result (TxACK) for terminal 2, which is predicted to fail to receive the downlink packet to the network device 200.

Accordingly, in the method of operating the network device 200 according to the present disclosure, the downlink packet (RX1) of terminal 2 is transmitted to BS 1 and it is determined whether the failure prediction result (TxACK) is received in S130. At this time, the time point at which the failure prediction result (TxACK) is received is referred to as a time point (C) of reception.

In the method of operating the network device 200 according to the present disclosure, when the failure prediction result (TxACK) is received (Yes of S130), it is determined whether retransmission of the downlink packet (RX1) of terminal 2 is required.

In a detailed embodiment of the method of operating the network device 200 according to the present disclosure, a packet transmission/reception time (RTT) between the network device 200 and BS 1 may be estimated by subtracting the time point (B) of transmission of the downlink packet (RX1) of terminal 2 from the time point (C) of reception of the failure prediction result (TxACK) in S140.

Thereafter, in the method of operating the network device 200 according to the present disclosure, it is determined whether terminal 2 can receive the downlink packet (RX1) in the first time interval (RX1) when the downlink packet (RX1) is retransmitted based on the time point (A) of reception of the uplink packet of terminal 2, the predetermined time (for example, one second) of the type A adopted by terminal 2, and the estimated packet transmission/reception time (RTT).

For example, when the downlink packet is retransmitted to terminal 2, the time spent when terminal 2 receives the retransmitted downlink packet may be predicted as half (RTT/2) of the estimated packet transmission/reception time (RTT).

Accordingly, it is possible to calculate the maximum time limit within which the downlink packet (RX1) can be received after terminal 2 transmits the uplink packet by adding (A+1) the time point (A) of reception of the uplink packet of terminal 2 and the predetermined time (for example, one second) of the type A adopted by terminal 2.

In the method of operating the network device 200 according to the present disclosure, when a remaining time ((A+1)-current time point) obtained by subtracting a current time point from a maximum time limit (A+1) is longer than RTT/2, it may be determined that terminal 2 can receive the downlink packet (RX1) in the first time interval (RX1) when the downlink packet is retransmitted.

In the method of operating the network device 200 according to the present disclosure, when it is determined that terminal 2 can receive the downlink packet (RX1) in the first time interval (RX1) in retransmission of the downlink packet (when retransmission is required in Yes of S150), the BS for terminal 2 is reselected in S160.

Specifically, in the method of operating the network device 200 according to the present disclosure, the BS having the best channel state (SNR) with terminal 2 is reselected from BSs 1, 2, and 3 that have received the uplink packet of terminal 2 and transmitted the uplink packet to the network device 200, other than BS 1, which has been selected previously.

That is, since failure to receive the downlink packet of terminal 2 is predicted through BS 1, which has been selected previously, the BS having the best channel state (SNR) with terminal 2 is reselected from the remaining BSs 2 and 3 except for BS 1 among BSs 1, 2, and 3, which have received the uplink packet of terminal 2 and transmitted the uplink packet to the network device 200.

Hereinafter, for convenience of description, BS 2 is reselected.

In the method of operating the network device 200 according to the present disclosure, the downlink packet (RX1) to be transmitted to terminal 2 is retransmitted to the reselected BS 2 in S120.

When BS 2, which has been reselected for terminal 2, occupies frequency resources for another terminal and thus downlink packet collision is recognized again, BS 2 may also provide the failure prediction result (TxACK) for terminal 2 to the network device 200, and the network device 200 may repeat steps S120 to S160 of reselecting the BS and retransmitting the downlink packet (RX1) when terminal 2 can receive the downlink packet (RX1) in the first time interval (RX1) in retransmission of the downlink packet (RX1).

Figure 8:
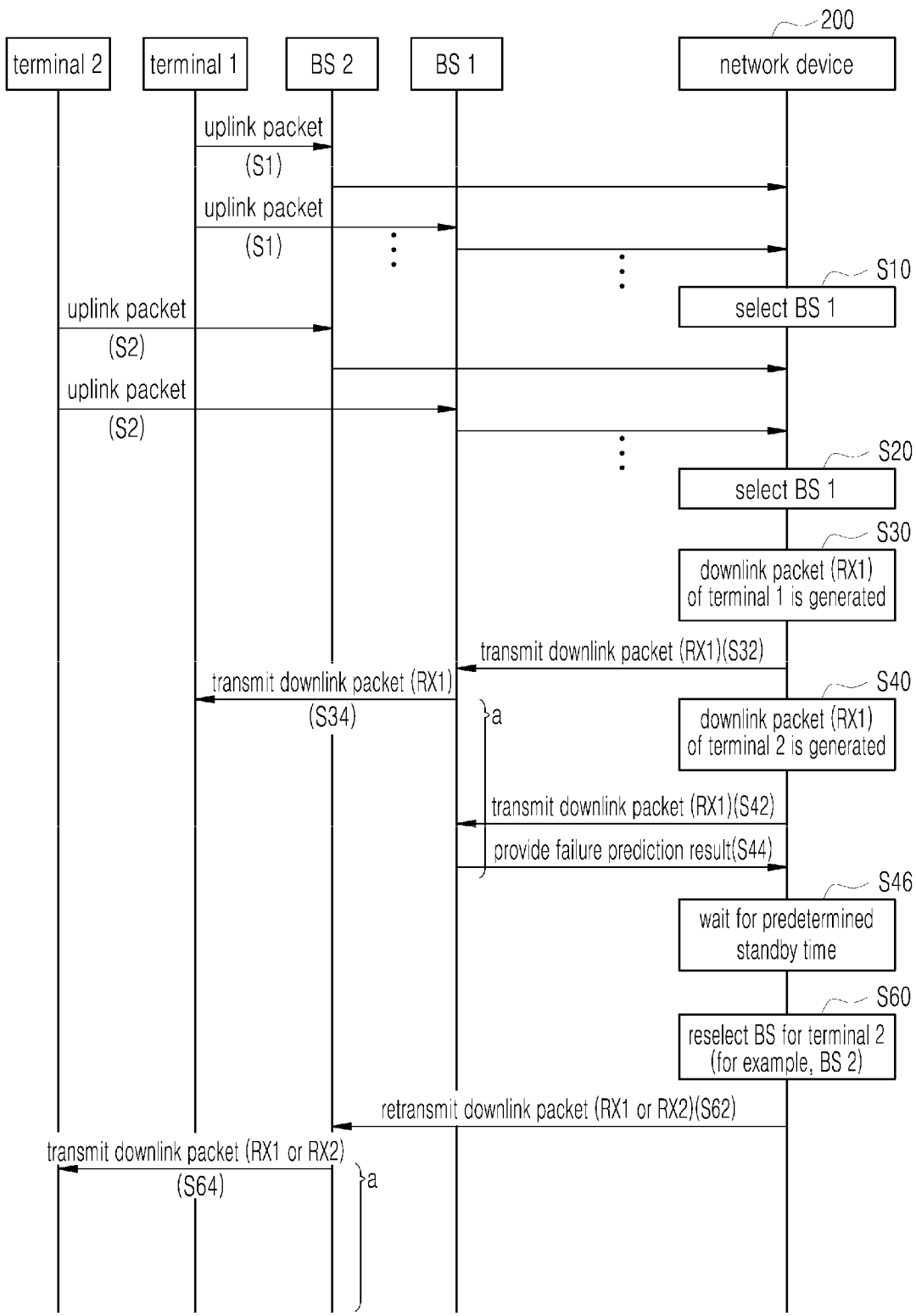
FIG. 8 is a flowchart illustrating a method (scheme) of reselecting a BS that transmits a downlink packet according to another embodiment of the present disclosure.

Hereinafter, a method (scheme) of reselecting the BS that transmits the downlink packet according to another embodiment of the present disclosure will be described with reference to FIG. 8.

For convenience of description, terminals 1 and 2 and BSs 1 and 2 will be used similar to the above-described embodiment.

Figure 7:
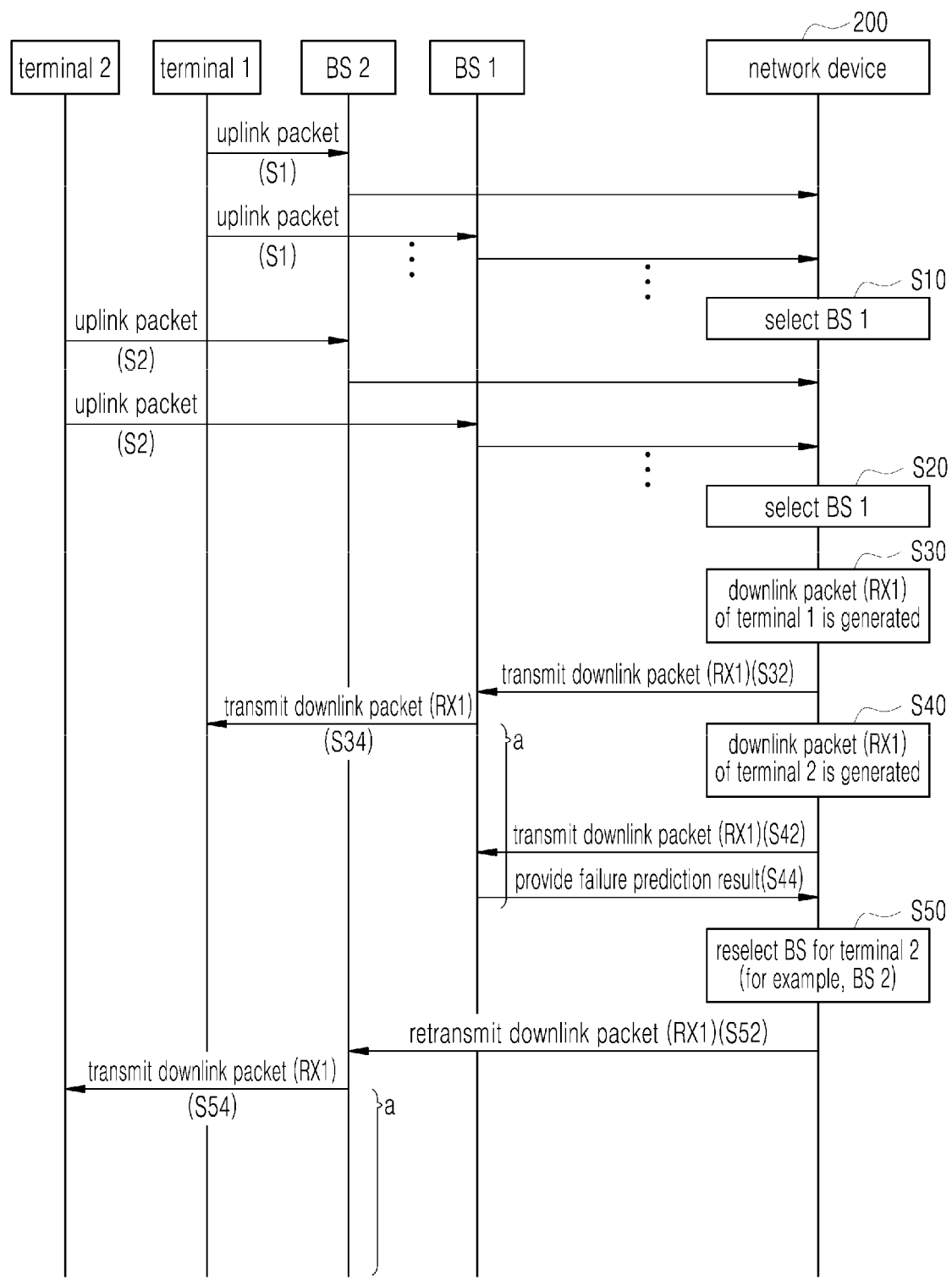
FIG. 7 is a flowchart illustrating a method (scheme) of reselecting a BS that transmits a downlink packet according to an embodiment of the present disclosure.

Since steps S1 to S20 are the same as the embodiment illustrated in FIG. 7, a detailed description thereof will be omitted, and it is assumed that the network device 200 selects BS 1 for each of terminal 1 and terminal 2.

When a downlink packet to be transmitted to terminal 1 is generated for the uplink packet of terminal 1, the network device 200 transmits the downlink packet of terminal 1, that is, the downlink packet (RX1), in the first time interval (RX1) to BS 1 in S30 and S32.

Since BS 1 is not occupying frequency resources for another terminal when receiving the downlink packet (RX1) of terminal 1, BS 1 transmits the downlink packet (RX1) of terminal 1, which has been received from the network device 200, to terminal 1 in S34.

After transmitting the uplink packet, terminal 1 may receive, from BS 1, the downlink packet (RX1) from the network device 200 in the first time interval (RX1).

Meanwhile, when a downlink packet to be transmitted to terminal 2 is generated for the uplink packet of terminal 2, the network device 200 transmits the downlink packet of terminal 2, that is, the downlink packet (RX1), to BS 1 in the time interval (RX1) in S40 and S42.

At this time, as BS 1 receives the downlink packet (RX1) of terminal 2 while occupying frequency resources for terminal 1 during the time (a), BS 1 to recognizes downlink packet collision and provides a failure prediction result (TxACK) for terminal 2, which is predicted to fail to receive the downlink packet, to the network device 200 in S44.

When receiving the failure prediction result (TxACK) for terminal 2 from BS 1, the network device 200 recognizes terminal 2, predicted to fail to receive the downlink packet, waits for a predetermined standby time based on the time point at which terminal 2 is recognized in S46, and then reselects the BS for terminal 2 and retransmits the downlink packet of terminal 2.

For example, when terminal 2 can receive the downlink packet (RX1) in the first time interval (RX1) in retransmission of the downlink packet based on the time point at which terminal 2, predicted to fail to receive the downlink packet, is recognized (time point of reception of the failure prediction result), the network device 200 immediately reselects the BS for terminal 2 in S60 and retransmits the downlink packet (RX1) in S62 without standby by setting the predetermined standby time as 0.

When it is assumed that the reselected BS is BS 2, BS 2 is not occupying frequency resources for another terminal when receiving the downlink packet (RX1) of terminal 2, so that BS 2 transmits the downlink packet (RX1) of terminal 2, which has been received from the network device 200, to terminal 2 in S64.

After transmitting the uplink packet, terminal 2 may receive, from BS 2, the downlink packet (RX1) from the network device 200 in the first time interval (RX1).

Meanwhile, when terminal 2 cannot receive the downlink packet (RX1) in the first time interval (RX1) in retransmission of the downlink packet based on the time point (time point of reception of the failure prediction result) at which terminal 2 predicted to fail to receive the downlink packet is recognized, that is, when the first time interval (RX1) of terminal 2 ends, the network device 200 waits for a predetermined standby time until entry into the second time interval (RX2) of terminal 2, and then reselects the BS for terminal 2 in S60 and retransmits the downlink packet (RX2) in S62.

When it is assumed that the reselected BS is BS 2, BS 2 is not occupying frequency resources for another terminal when receiving the downlink packet (RX2) of terminal 2, so that BS 2 transmits the downlink packet (RX2) of terminal 2, which has been received from the network device 200, to terminal 2 in S64.

After transmitting the uplink packet, terminal 2 may receive, from BS 2, the downlink packet (RX2) from the network device 200 in the second time interval (RX2).

Figure 10:
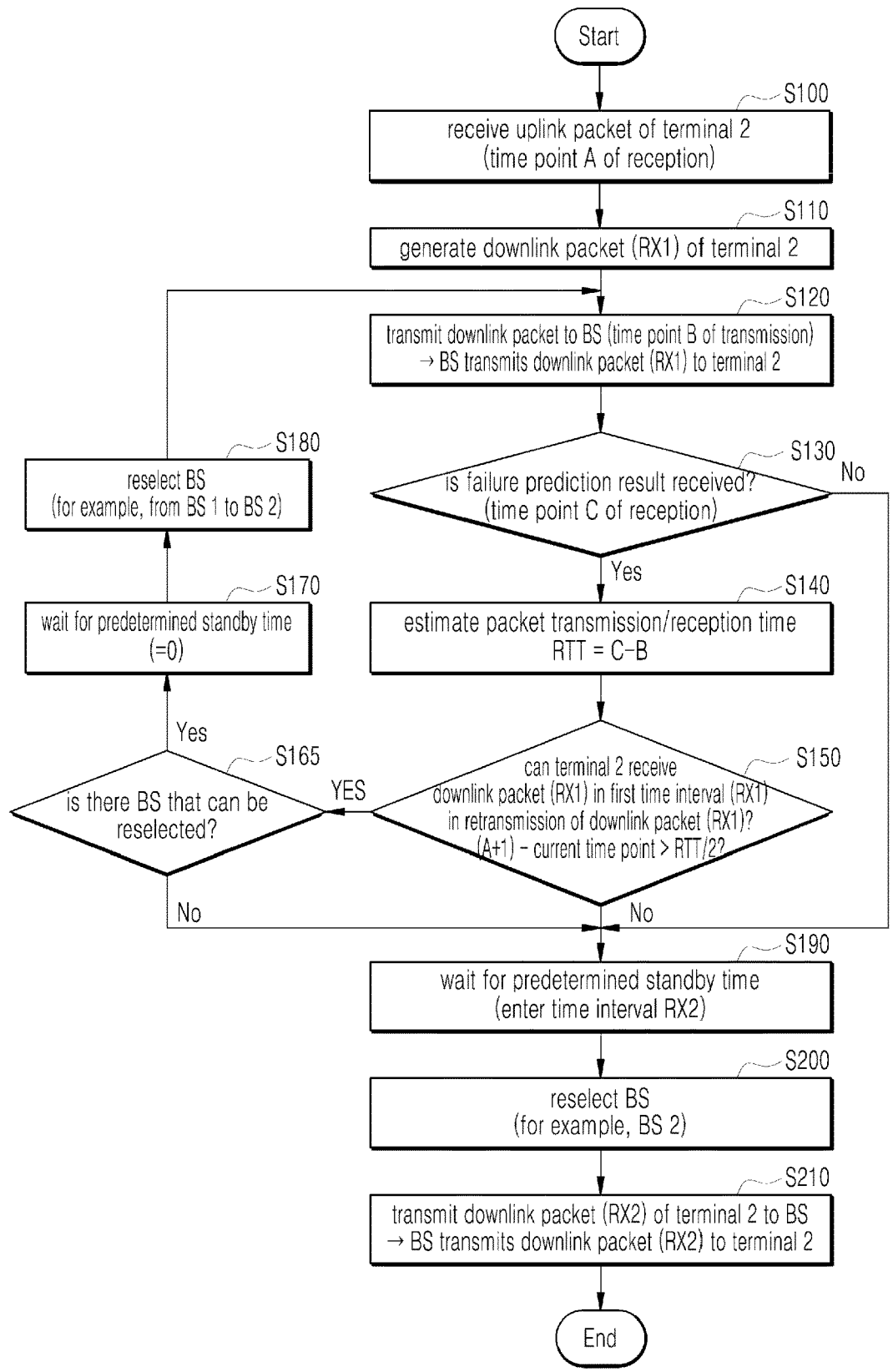
FIG. 10 is a flowchart illustrating a method of operating the network device according to another embodiment of the present disclosure.

Hereinafter, the method of operating the network device according to another embodiment of the present disclosure will be described with reference to FIG. 10.

The method of operating the network device 200 according to the present disclosure receives an uplink packet from the terminal through the BS.

Hereinafter, for convenience of description, terminal 2 will be used, similar to the above-described example.

That is, the method of operating the network device 200 according to the present disclosure receives an uplink packet from terminal 2, which is received through the BS in S100. Further, the time point at which the uplink packet of terminal 2 is received is referred to as a time point (A) of reception.

At this time, the method of operating the network device 200 according to the present disclosure selects, as the BS (for example, BS 1) for packet transmission/reception to/from terminal 2, the BS having the best channel state (SNR) with the terminal among a plurality of BSs 1, 2, and 3 providing (transmitting) the uplink packet of terminal 2.

Thereafter, when a downlink packet to be transmitted to terminal 2 for the uplink packet of terminal 2 is generated in S110, the downlink packet of terminal 2, that is, the downlink packet (RX1), is transmitted to the pre-selected BS 1 in the first time interval (RX1) in S120 in the method of operating the network device 200 according to the present disclosure. At this time, the time point at which the downlink packet (RX1) of terminal 2 is transmitted is referred to as a time point (B) of transmission.

BS 1 is required to transmit the downlink packet (RX1) of terminal 2, which has been received from the network device 200, to terminal 2.

However, when BS 1 receives the downlink packet of terminal 2 for a predetermined time (a) in which BS 1 occupies frequency resources for terminal 1, BS 1 recognizes it as downlink packet collision and provides a failure prediction result (TxACK) for terminal 2, predicted to fail to receive the downlink packet, to the network device 200.

Accordingly, in the method of operating the network device 200 according to the present disclosure, the downlink packet (RX1) of terminal 2 is transmitted to BS 1, and it is determined whether the failure prediction result (TxACK) is received in S130. At this time, the time point at which the failure prediction result (TxACK) is received is referred to as a time point (C) of reception.

In the method of operating the network device 200 according to the present disclosure, when the failure prediction result (TxACK) of terminal 2 is received (Yes of S130), the network device 200 waits for a predetermined standby time based on the time point at which terminal 2 is recognized (time point of reception of the failure prediction result), and then reselects the BS for terminal 2 and retransmits the downlink packet of terminal 2.

In a detailed embodiment, in the method of operating the network device 200 according to the present disclosure, the predetermined standby time for which reselection of the BS for terminal 2, predicted to fail to receive the downlink packet, and retransmission of the downlink packet are postponed may be differently applied according to the time point at which terminal 2 is recognized, that is, the time point at which the failure prediction result (TxACK) for terminal 2 is received.

More specifically, in the method of operating the network device 200 according to the present disclosure, a packet transmission/reception time (RTT) with BS 1 is estimated based on the time point (B) of transmission of the downlink packet (RX1) transmitted in the first time interval (RX1) of terminal 2 and the time point (C) of reception of the failure prediction result (TxACK) for terminal 2 received from BS 1 in S140.

For example, as illustrated in FIG. 5, it is possible to calculate and estimate the packet transmission/reception time (RTT) between the network device 200 and BS 1 by subtracting the time point (B) of transmission of the downlink packet (RX1) of terminal 2 from the time point (C) of reception of the failure prediction result (TxACK).

Further, in the method of operating the network device 200 according to the present disclosure, it is determined whether terminal 2 can receive the downlink packet (RX1) in the first time interval (RX1) in retransmission of the downlink packet based on the time point (A) of reception of the uplink packet of terminal 2, the predetermined time (for example, one second) of the type A adopted by terminal 2, and the estimated packet transmission/reception time (RTT) in S150.

For example, when the downlink packet is retransmitted to terminal 2, the time spent for terminal 2 to receive the retransmitted downlink packet may be predicted as half (RTT/2) of the estimated packet transmission/reception time (RTT).

Accordingly, it is possible to calculate a maximum time limit within which the downlink packet (RX1) can be received after terminal 2 transmits the uplink packet by adding (A+1) the time point (A) of reception of the uplink packet of terminal 2 and the predetermined time (for example, one second) of the type A adopted by terminal 2 and calculate the remaining time left until the maximum time limit (A+1) by subtracting the current time point from the maximum time limit (A+1).

In the method of operating the network device 200 according to the present disclosure, when a remaining time ((A+1)−current time point) obtained by subtracting a current time point from a maximum time limit (A+1) is longer than RTT/2, it may be determined that terminal 2 can receive the downlink packet (RX1) in the first time interval (RX1) when the downlink packet is retransmitted (Yes of S150).

In the method of operating the network device 200 according to the present disclosure, when terminal 2 can receive the downlink packet (RX1) in the first time interval (RX1) based on the determination result (Yes of S150), it is determined whether there is a BS that can be reselected among BSs 1, 2, and 3, which have received the uplink packet of terminal 2 and transmitted the uplink packet to the network device 200 in S165.

As described above, when failure to receive the downlink packet of terminal 2 is predicted only through BS 1 among BSs 1, 2, and 3 that have received the uplink packet of terminal 2 and transmitted the uplink packet to the network device 200, it may be determined that BSs 2 and 3, which can be reselected, exist (Yes of S165).

In the method of operating the network device 200 according to the present disclosure, when it is determined that BSs 2 and 3, which can be reselected, exist, the BS having the best channel state (SNR) with terminal 2 is reselected from the remaining BSs 2 and 3 that can be reselected, except for BS 1, which has been selected previously, among BSs 1, 2, and 3, which have received the uplink packet of terminal 2 and transmitted the uplink packet to the network device 200 in S170.

Hereinafter, for convenience of description, BS 2 is reselected.

The method of operating the network device 200 according to the present disclosure, the BS for terminal 2 is reselected (from BS 1 to BS 2) and the downlink packet (RX1) to be transmitted to terminal 2 is retransmitted to the reselected BS 2 in S120.

Then, BS 2 may transmit the downlink packet (RX1) of terminal 2, which has been received from the network device 200, to terminal 2, and terminal 2 may receive, from BS 2, the downlink packet (RX1) from the network device 200 within the first time interval (RX1).

That is, in the method of operating the network device 200 according to the present disclosure, when terminal 2 can receive the downlink packet (RX1) in the first time interval (RX1) in retransmission of the downlink packet based on the time point at which terminal 2, which is predicted to fail to receive the downlink packet, is recognized (time point of reception of the failure prediction result), the network device 200 immediately (predetermined standby time=0) reselects the BS for terminal 2 and retransmits the downlink packet.

However, as illustrated in FIG. 6, if BS 2, which is reselected for terminal 2, occupies frequency resources for another terminal and thus downlink packet collision is recognized again, BS 2 also provides the failure prediction result (TxACK) for terminal 2 to the network device 200.

Then, in the method of operating the network device 200 according to the present disclosure, the network device 200 repeats steps S120 to S150 of estimating a packet transmission/reception time (RTT) with BS 2 based on the time point (C) at which the failure prediction result (TxACK) for terminal 2 is received from BS 2 and determining whether the remaining time ((A+1)−current time point) obtained by subtracting the current time point from the maximum time limit (A+1) is longer than RTT/2 so as to determine whether terminal 2 can receive the downlink packet (RX1) in the first time interval (RX1) in retransmission of the downlink packet.

Meanwhile, even though terminal 2 can receive the downlink packet (RX1) in the first time interval (RX1) when the downlink packet is retransmitted, there may be no BS that can be reselected for terminal 2.

In the method of operating the network device 200 according to the present disclosure, when terminal 2 can receive the downlink packet (RX1) in the first time interval (RX1) in retransmission of the downlink packet (Yes of S150) but there is no BS that can be reselected for terminal 2 (No of S165), the network device 200 reselects the BS for terminal 2 in S200 and retransmits the downlink packet (RX2) of terminal 2 in S210 after waiting for the predetermined standby time until the time point of entry into the second time interval (RX2) of terminal 2 in S190.

As described above, terminal 2 operates in the type A, in which terminal 2 can receive the downlink packet for the uplink packet in a predetermined time interval (for example, one second) a particular number of times (for example, two times) after transmitting the uplink packet.

After transmitting the uplink packet, terminal 2 can receive the downlink packet in the first time interval (RX1), corresponding to one second, and can receive the downlink packet in the second time interval (RX2), corresponding to one second, after the first time interval (RX1) ends.

Hereinafter, for convenience of description, the downlink packet transmitted in the second time interval (RX2) after standby for a predetermined standby time until the time point of entry into the second time interval (RX2) of terminal 2 is defined as the downlink packet (RX2).

That is, in the method of operating the network device 200 according to the present disclosure, when it is determined that retransmission of the downlink packet is not possible since there is no longer any BS that can be reselected based on the time point at which terminal 2, predicted to fail to receive the downlink packet, is recognized (time point of reception of the failure prediction result) (No of S160), the BS reselection for terminal 2 and the retransmission of the downlink packet are postponed for the predetermined standby time until entry into the second time interval (RX2), in which a condition (occupation of frequency resources) of the BS is improved and thus the BS reselection is possible in S190.

At this time, in the method of operating the network device 200 according to the present disclosure, the BS having the best channel state (SNR) with terminal 2 may be reselected from BSs 1, 2, and 3, which have received the uplink packet of terminal 2 and transmitted the uplink packet to the network device 200 in S200.

That is, in the method of operating the network device 200 according to the present disclosure, since the network device 200 has waited for the predetermined standby time until the entry into the second time interval (RX2) of terminal 2, the BS having the best channel state (SNR) with terminal 2 may be reselected from all of BSs 1, 2, and 3 without excluding the BSs that have been selected previously in the first time interval (RX1) of terminal 2, among BSs 1, 2, and 3 in S200.

Hereinafter, for convenience of description, BS 2 is reselected.

Then, BS 2 may transmit the downlink packet (RX2) of terminal 2, which has been received from the network device 200, to terminal 2, and terminal 2 may receive the downlink packet (RX2) from the network device 200 in the second time interval (RX2) despite failing to receive the downlink packet (RX1) in the first time interval (RX1).

Meanwhile, in the method of operating the network device 200 according to the present disclosure, when terminal 2 cannot receive the downlink packet to (RX1) in the first time interval (RX1) based on the result of the determination about the reception of the downlink packet (RX1) in retransmission of the downlink packet, the network device 200 waits for the predetermined standby time until the time point of entry into the second time interval (RX2) of terminal 2 in S190, and then reselects the BS for terminal 2 in S200 and retransmits the downlink packet (RX2) of terminal 2 in S210.

At this time, when terminal 2 cannot receive the downlink packet (RX1) in the first time interval (RX1) when the downlink packet is retransmitted, it is considered that the first time interval (RX1) of terminal 2 ends.

That is, in the method of operating the network device 200 according to the present disclosure, when it is determined that the first time interval (RX1) of terminal 2 ends based on the time point at which terminal 2, predicted to fail to receive the downlink packet, is recognized (time point of reception of the failure prediction result) (No of S150), terminal 2 cannot receive the downlink packet even though the downlink packet is retransmitted, so that the BS reselection for terminal 2 and the retransmission of the downlink packet are postponed for the predetermined standby time until entry into the second time interval (RX2), in which terminal 2 can receive the downlink packet, in S190.

At this time, in the method of operating the network device 200 according to the present disclosure, since the network device 200 has waited for the predetermined standby time until entry into the second time interval (RX2) of terminal 2, the BS having the best channel state (SNR) with terminal 2 may be reselected from all of BSs 1, 2, and 3 without excluding the BSs that have been selected previously in the first time interval (RX1) of terminal 2, among BSs 1, 2, and 3 in S200.

Hereinafter, for convenience of description, BS 2 is reselected.

Then, BS 2 may transmit the downlink packet (RX2) of terminal 2, which has been received from the network device 200, to terminal 2, and terminal 2 may receive the downlink packet (RX2) from the network device 200 in the second time interval (RX2) despite failing to receive the downlink packet (RX1) in the first time interval (RX1).

According to the method of reselecting the BS that transmits the downlink packet and the method of operating the network device according to the present disclosure as described above, it is possible to derive an effect of improving the quality of an IoT service by increasing the success rate of reception of a downlink packet transmitted to an IoT terminal.

The implementations of the functional operations and subject matter described in the present disclosure may be realized by a digital electronic circuit, by the structure described in the present disclosure and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

Implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should not be understood that the operations are performed in the shown specific sequence or that all shown operations are performed in order to obtain a preferable result. In a specific case, a multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A network device comprising:
   a packet transmitter configured to transmit a downlink packet, which is to be transmitted to a terminal, to a Base Station (BS) selected, among a plurality of base stations communicated with the packet transmitter, for packet transmission/reception for each terminal;
   a recognition unit configured to recognize a specific terminal predicted to fail to receive the downlink packet in a specific BS; and
   a controller configured to, when the specific terminal is recognized,
      determine a time point of reselection for packet transmission/reception for the specific terminal, and
      reselect, among the plurality of base stations, a BS for the specific terminal at the determined time point in order to retransmit the downlink packet of the specific terminal to the reselected BS.

2. A network device comprising:
   a packet transmitter configured to transmit a downlink packet, which is to be transmitted to a terminal, to a Base Station (BS) selected, among a plurality of base stations communicated with the packet transmitter, for packet transmission/reception for each terminal;
   a recognition unit configured to recognize a specific terminal predicted to fail to receive the downlink packet in a specific BS; and
   a controller configured to, when the specific terminal is recognized, reselect a BS for the specific terminal and retransmit the downlink packet of the specific terminal to the reselected BS.

3. The network device of claim 2, wherein
   the specific terminal, after transmitting an uplink packet, is configured to receive a downlink packet for the uplink packet in a predetermined time interval by a particular number of times, and
   the recognition unit, when a failure prediction result predicting failure of transmission of a downlink packet is received from the specific BS for a terminal, is configured to recognize the terminal as the specific terminal, the downlink packet being transmitted for the uplink packet at a first time interval corresponding to the first of the particular number of times.

4. The network device of claim 3, wherein the controller estimates a packet transmission/reception time with the specific BS based on a time point of transmission of the downlink packet of the specific terminal in the first time interval and a time point of reception of the failure prediction result for the downlink packet and determines whether to reselect the BS for the specific terminal based on the packet transmission/reception time.

5. The network device of claim 4, wherein the controller is configured to
   determine whether the specific terminal is allowed to receive the downlink packet in the first time interval when the downlink packet is retransmitted, based on a time point of reception of an uplink packet of the specific terminal, the predetermined time, and the packet transmission/reception time, and
   reselect the BS for the specific terminal when the specific terminal is allowed to receive the downlink packet.

6. The network device of claim 2, wherein the controller is configured to reselect a BS having the best channel state of Signal to Noise Ratio (SNR) with the specific terminal from base stations except for the specific BS from the base stations that have received the uplink packet of the specific terminal and transmitted the uplink packet to the network device.

7. A network device comprising:
   a packet transmitter configured to transmit a downlink packet, which is to be transmitted to a terminal, to a Base Station (BS), among a plurality of base stations communicated with the packet transmitter, for packet transmission/reception for each terminal;
   a recognition unit configured to recognize a specific terminal predicted to fail to receive the downlink packet in a specific BS; and
   a controller configured to, when the specific terminal is recognized,
      wait for a predetermined standby time based on a time point at which the specific terminal is recognized,
      reselect a BS, among the plurality of base stations, for the specific terminal, and
      retransmit the downlink packet of the specific terminal to the reselected BS.

8. The network device of claim 7, wherein
   the specific terminal, after transmitting an uplink packet, is configured to receive a downlink packet for the uplink packet in a predetermined time interval by a particular number of times, and the recognition unit, when a failure prediction result predicting failure of transmission of a downlink packet is received from the specific BS for a terminal, is configured to recognize the terminal as the specific terminal, the downlink packet being transmitted for the uplink packet at a first time interval corresponding to the first of the particular number of times.

9. The network device of claim 8, wherein the controller
estimates a packet transmission/reception time with the specific BS based on a time point of reception of the failure prediction result by which the specific terminal is recognized,
determines whether the specific terminal is allowed to receive the downlink packet at the first time interval when the downlink packet is retransmitted, based on a time point of reception of an uplink packet of the specific terminal, the predetermined time, and the packet transmission/reception time, and
waits for a predetermined standby time until entry into a second time interval corresponding to the second of the particular number of times and reselects the BS for the specific terminal, when the specific terminal is not allowed to receive the downlink packet based on the determination result.

10. The network device of claim 9, wherein the controller reselects the BS for the specific terminal without standby by setting the predetermined standby time as 0 when the specific terminal is allowed to receive the downlink packet based on a result of the determination.

11. The network device of claim 9, wherein, when the specific terminal is allowed to receive the downlink packet based on a result of the determination but there is no BS configured to be reselected for the specific terminal, the controller waits for the predetermined standby time until entry into the second time interval of the specific terminal and then reselects the BS for the specific terminal.

12. The network device of claim 7, wherein the controller is configured to reselect a BS having the best channel state of Signal to Noise Ratio (SNR) with the specific terminal from base stations that have received an uplink packet of the specific terminal and transmitted the uplink packet to the network device.

13. A Base Station (BS) device for transmitting/receiving a packet between a terminal and a network device, the BS device comprising:
a processor configured to
identify whether there is a specific terminal predicted to fail to transmit a downlink packet during a process of transmitting a downlink packet, which has been received from the network device, to the terminal, and
when the specific terminal is identified, provide a failure prediction result for the specific terminal to the network device,
wherein, while the BS device transmits the downlink packet to a first terminal and occupies frequency resources for transmission of the next downlink packet,
the processor identifies a second terminal as the specific terminal predicted to fail to transmit the downlink packet when the BS device receives the downlink packet of the second terminal from the network device.

* * * * *